United States Patent
Nordby et al.

(10) Patent No.: US 12,299,218 B2
(45) Date of Patent: *May 13, 2025

(54) ACTIVE PEN-STYLUS PRECISE ERASER

(71) Applicant: reMarkable AS, Oslo (NO)

(72) Inventors: Gaute Wiig Nordby, Oslo (NO); Torje Asdahl, Oslo (NO); Anna Karoline Øren Lillerud, Oslo (NO); Espen Lie, Oslo (NO)

(73) Assignee: reMarkable AS, Oslo (NO)

( * ) Notice: Subject to any disclaimer, the term of this patent is extended or adjusted under 35 U.S.C. 154(b) by 0 days.

This patent is subject to a terminal disclaimer.

(21) Appl. No.: 18/779,149

(22) Filed: Jul. 22, 2024

(65) Prior Publication Data
US 2024/0411391 A1    Dec. 12, 2024

Related U.S. Application Data

(63) Continuation-in-part of application No. 18/208,280, filed on Jun. 11, 2023, now Pat. No. 12,045,404.

(51) Int. Cl.
G06F 3/0354    (2013.01)
G06F 3/0346    (2013.01)
(Continued)

(52) U.S. Cl.
CPC .......... G06F 3/0383 (2013.01); G06F 3/0346 (2013.01); G06F 3/03545 (2013.01);
(Continued)

(58) Field of Classification Search
CPC .. G06F 3/0383; G06F 3/0346; G06F 3/03545; G06F 2203/0384; G09G 3/344; G09G 2354/00
See application file for complete search history.

(56) References Cited

U.S. PATENT DOCUMENTS 6,064,765 A    5/2000    Hirayama
6,151,206 A    11/2000   Kato et al.
(Continued)

FOREIGN PATENT DOCUMENTS

CN    104142705 A    11/2014
DE    202013101011 U1    5/2013
(Continued)

OTHER PUBLICATIONS

A publication regarding the Aspire Switch 10 ("Acer") published on Aug. 1, 2014.
(Continued)

*Primary Examiner* — Saiful A Siddiqui
(74) *Attorney, Agent, or Firm* — AWA Sweden AB; Thomas L. Ewing

(57) ABSTRACT

Embodiments of the invention provide an improved structure and method for determining the tilt angle associated with the erasure component of an active pen-stylus relative to the display on a matching computing device by analysis of two different antenna signals associated with the erasure function and then employing this calculated tilt angle to determine an area of erasure on the display device associated with the active pen-stylus. Embodiments of the invention may effectively copy in an electronic eraser, the ability of a conventional rubber eraser to control an area of erasure based on the tilt of the eraser, e.g., a heavy area of erasure when the eraser is held at an angle or a shallow area of erasure when the eraser is held in a more upright position.

12 Claims, 13 Drawing Sheets

(51) Int. Cl.
  *G06F 3/038*  (2013.01)
  *G09G 3/34*  (2006.01)
(52) U.S. Cl.
  CPC ..... *G06F 2203/0384* (2013.01); *G09G 3/344* (2013.01); *G09G 2354/00* (2013.01)

(56) References Cited

U.S. PATENT DOCUMENTS

| | | | |
|---|---|---|---|
| 7,145,092 B2 | 12/2006 | Tuhkala | |
| 7,239,505 B2 | 7/2007 | Keely et al. | |
| 7,461,444 B2 | 12/2008 | Deaett et al. | |
| 7,722,358 B2 | 5/2010 | Chatterjee et al. | |
| 7,941,191 B2 | 5/2011 | Hanssen et al. | |
| D645,465 S | 9/2011 | Lin | |
| 8,022,307 B2 | 9/2011 | Chu et al. | |
| 8,143,983 B1 | 3/2012 | Lauder et al. | |
| D671,114 S | 11/2012 | Akana | |
| 8,498,100 B1 | 7/2013 | Whitt et al. | |
| D689,482 S | 9/2013 | Akana | |
| D692,886 S | 11/2013 | Bates | |
| 8,638,320 B2 | 1/2014 | Harley | |
| D701,205 S | 3/2014 | Akana | |
| D702,229 S | 4/2014 | Lim | |
| 8,688,037 B2 | 4/2014 | Chatterjee et al. | |
| D704,702 S | 5/2014 | Akana | |
| D705,775 S | 5/2014 | Canizares | |
| 8,724,302 B2 | 5/2014 | Whitt et al. | |
| 8,780,541 B2 | 7/2014 | Whitt et al. | |
| D711,371 S | 8/2014 | Chen | |
| 8,817,457 B1 | 8/2014 | Colby | |
| 8,873,227 B2 | 10/2014 | Whitt et al. | |
| 8,947,864 B2 | 2/2015 | Whitt et al. | |
| 8,947,868 B2 | 2/2015 | Motoishi et al. | |
| 8,964,379 B2 | 2/2015 | Rihn | |
| 9,017,092 B1 | 4/2015 | McCracken | |
| 9,146,620 B2 | 9/2015 | Whitt et al. | |
| 9,149,100 B2 | 10/2015 | Marshall | |
| 9,213,424 B1 * | 12/2015 | Dunn | G06F 3/0441 |
| 9,218,025 B2 | 12/2015 | Bates | |
| 9,244,535 B2 | 1/2016 | Bates | |
| D750,621 S | 3/2016 | Loor Canizares | |
| 9,280,181 B2 | 3/2016 | Tomita et al. | |
| 9,335,793 B2 | 5/2016 | Rothkopf | |
| 9,390,869 B2 | 7/2016 | Lee | |
| 9,436,229 B2 | 9/2016 | Yoo | |
| 9,442,518 B2 | 9/2016 | Siddiqui | |
| 9,443,673 B2 | 9/2016 | Chu | |
| 9,451,822 B2 | 9/2016 | Gu | |
| 9,494,976 B2 | 11/2016 | Bates | |
| 9,494,977 B2 | 11/2016 | Spollen | |
| 9,496,102 B2 | 11/2016 | Bates | |
| D773,454 S | 12/2016 | Akana | |
| D776,116 S | 1/2017 | Akana | |
| 9,532,631 B2 | 1/2017 | Gu | |
| 9,552,014 B2 | 1/2017 | Tomita | |
| D779,485 S | 2/2017 | Akana | |
| 9,575,515 B2 | 2/2017 | Leon | |
| 9,588,551 B1 | 3/2017 | Hegde | |
| 9,607,491 B1 | 3/2017 | Mortimer | |
| 9,621,214 B2 | 4/2017 | Paek | |
| 9,632,602 B2 | 4/2017 | Marwah | |
| D786,238 S | 5/2017 | Roberts | |
| 9,678,542 B2 | 6/2017 | Whitt et al. | |
| D792,393 S | 7/2017 | Akana | |
| 9,705,242 B1 | 7/2017 | Heiskanen | |
| 9,705,243 B1 | 7/2017 | McCracken | |
| 9,715,251 B2 | 7/2017 | Chung | |
| D795,249 S | 8/2017 | Wall | |
| 9,720,453 B2 | 8/2017 | Nelson | |
| 9,728,915 B2 | 8/2017 | Aldehayyat | |
| 9,760,183 B2 | 9/2017 | Kawaguchi | |
| 9,762,279 B2 | 9/2017 | Lee | |
| 9,769,293 B2 | 9/2017 | Gu | |
| D801,330 S | 10/2017 | Morgan | |
| 9,778,705 B2 | 10/2017 | Esmaeili | |
| 9,785,193 B2 | 10/2017 | Sano | |
| 9,823,093 B2 | 11/2017 | Kauhaniemi | |
| D804,470 S | 12/2017 | Hallar | |
| 9,840,861 B1 | 12/2017 | Määttä | |
| 9,851,759 B2 | 12/2017 | Tazbaz | |
| D807,348 S | 1/2018 | Wang | |
| 9,883,583 B2 | 1/2018 | Cousins | |
| D810,075 S | 2/2018 | Liu | |
| D810,745 S | 2/2018 | Luo | |
| 9,893,452 B2 | 2/2018 | Wagman | |
| 9,904,327 B2 | 2/2018 | Whitt et al. | |
| 9,904,373 B2 | 2/2018 | Shirata | |
| 9,904,379 B2 | 2/2018 | Marshall | |
| 9,930,773 B2 | 3/2018 | Holbery | |
| 9,946,295 B2 | 4/2018 | Smith | |
| 9,946,296 B2 | 4/2018 | Smith | |
| 9,952,623 B2 | 4/2018 | Tomita | |
| 9,965,000 B2 | 5/2018 | Koppal | |
| 9,977,460 B2 | 5/2018 | Wagman | |
| D820,838 S | 6/2018 | Akana | |
| D820,839 S | 6/2018 | Akana | |
| D820,840 S | 6/2018 | Akana | |
| D820,841 S | 6/2018 | Akana | |
| 9,997,305 B2 | 6/2018 | Wang | |
| 9,997,308 B2 | 6/2018 | Leong | |
| 9,998,166 B2 | 6/2018 | Kim | |
| 10,013,030 B2 | 7/2018 | Whitt et al. | |
| 10,050,368 B2 | 8/2018 | Wagman | |
| 10,056,205 B2 | 8/2018 | Hegde | |
| 10,061,359 B2 | 8/2018 | Määttä | |
| 10,082,840 B2 | 9/2018 | Esmaeili | |
| 10,082,913 B2 | 9/2018 | Moller | |
| 10,090,121 B2 | 10/2018 | Winter | |
| D832,836 S | 11/2018 | Akana | |
| D835,097 S | 12/2018 | Morgan | |
| 10,153,577 B2 | 12/2018 | Wagman | |
| D839,266 S | 1/2019 | Chang | |
| 10,175,782 B2 | 1/2019 | Katsuhara | |
| D842,852 S | 3/2019 | Kim | |
| 10,257,950 B2 | 4/2019 | Määttä | |
| 10,289,210 B1 | 5/2019 | Wang | |
| 10,303,209 B2 | 5/2019 | Smith | |
| 10,303,215 B2 | 5/2019 | Corbin | |
| 10,317,953 B2 | 6/2019 | Esmaeili | |
| D852,794 S | 7/2019 | Huebner | |
| 10,345,916 B2 | 7/2019 | Gu | |
| 10,353,485 B1 | 7/2019 | Zhang | |
| 10,362,670 B2 | 7/2019 | Cousins | |
| D856,322 S | 8/2019 | Huebner | |
| 10,372,159 B2 | 8/2019 | Kim | |
| 10,418,741 B2 | 9/2019 | Wagman | |
| D867,452 S | 11/2019 | Morris | |
| 10,466,804 B2 | 11/2019 | Murphy | |
| 10,468,211 B2 | 11/2019 | Leong | |
| 10,474,199 B2 | 11/2019 | Longo | |
| 10,481,746 B2 | 11/2019 | Moller | |
| 10,483,688 B2 | 11/2019 | Wrisley | |
| 10,520,127 B2 | 12/2019 | Dearsley | |
| 10,551,878 B2 | 2/2020 | Longo | |
| 10,566,151 B1 | 2/2020 | Wang | |
| 10,579,097 B2 | 3/2020 | Wagman | |
| 10,590,600 B1 | 3/2020 | Wang | |
| 10,635,186 B1 | 4/2020 | Wang | |
| 10,672,548 B2 | 6/2020 | Srinivasan | |
| 10,683,591 B1 | 6/2020 | Podhajny | |
| 10,725,544 B1 | 7/2020 | Taylor | |
| 10,732,728 B1 | 8/2020 | Sunshine | |
| 10,739,825 B2 | 8/2020 | Gilbert | |
| 10,754,393 B2 | 8/2020 | Campbell | |
| D901,486 S | 11/2020 | Moon | |
| 10,890,954 B2 | 1/2021 | Evans | |
| 10,908,652 B2 | 2/2021 | Määttä | |
| 10,921,863 B2 | 2/2021 | Gault | |
| 10,923,261 B2 | 2/2021 | Singla | |
| 10,936,020 B2 | 3/2021 | Chang | |
| 10,948,999 B2 | 3/2021 | Hewett | |
| 11,023,016 B2 | 6/2021 | Kim | |
| 11,048,304 B2 | 6/2021 | Kang | |
| 11,048,337 B2 | 6/2021 | Fukumoto | |

(56) References Cited

U.S. PATENT DOCUMENTS

| | | |
|---|---|---|
| 11,061,442 B2 | 7/2021 | Gault |
| 11,062,831 B2 | 7/2021 | Määttä |
| 11,066,861 B2 | 7/2021 | Zhu |
| 11,073,871 B2 | 7/2021 | Jung |
| D928,145 S | 8/2021 | Solberg |
| D928,146 S | 8/2021 | Solberg |
| 11,086,975 B2 | 8/2021 | Huang et al. |
| 11,091,855 B2 | 8/2021 | Holbery |
| 11,095,071 B2 | 8/2021 | Lee |
| 11,119,535 B2 | 9/2021 | Haworth |
| 11,211,212 B2 | 12/2021 | Huang |
| 2003/0034960 A1 | 2/2003 | Li |
| 2011/0147398 A1 | 6/2011 | Ahee |
| 2011/0238055 A1 | 9/2011 | Kim |
| 2012/0327042 A1* | 12/2012 | Harley ............... G06F 3/0442 345/179 |
| 2014/0043242 A1 | 2/2014 | Dietz |
| 2014/0211393 A1 | 7/2014 | Lee |
| 2015/0029161 A1 | 1/2015 | Koo |
| 2016/0364027 A1* | 12/2016 | Bernstein ........... G06F 3/0482 |
| 2017/0038842 A1 | 2/2017 | Yairi |
| 2018/0052534 A1* | 2/2018 | Ron .................... G06T 11/60 |
| 2018/0348898 A1 | 12/2018 | Kato |
| 2019/0369755 A1* | 12/2019 | Roper ................. G06F 3/0442 |
| 2020/0401241 A1 | 12/2020 | Barel |
| 2021/0031235 A1 | 2/2021 | Neuwirth |
| 2021/0103346 A1 | 4/2021 | Hoshino |
| 2021/0247845 A1 | 8/2021 | Kügerl |
| 2021/0247858 A1 | 8/2021 | Hashimoto |
| 2021/0255716 A1 | 8/2021 | Jin |
| 2021/0311603 A1* | 10/2021 | Baki .................... G06F 3/046 |
| 2022/0033600 A1 | 2/2022 | Hoshino |
| 2022/0334661 A1 | 10/2022 | Barel |
| 2023/0045649 A1 | 2/2023 | Chen |
| 2023/0108860 A1 | 4/2023 | Hashimoto |
| 2023/0234392 A1 | 7/2023 | Duffy |
| 2024/0019945 A1 | 1/2024 | Horie |
| 2024/0094834 A1 | 3/2024 | Lee |
| 2024/0411387 A1 | 12/2024 | Kato |

FOREIGN PATENT DOCUMENTS

| | | | |
|---|---|---|---|
| WO | 2001031457 A1 | 5/2001 | |
| WO | 2021194484 A1 | 9/2021 | |

OTHER PUBLICATIONS

PCT International Search Report and Written Opinion, PCT Application No. PCT/IB2022/000703, Jun. 2, 2023, 19 pages.

* cited by examiner

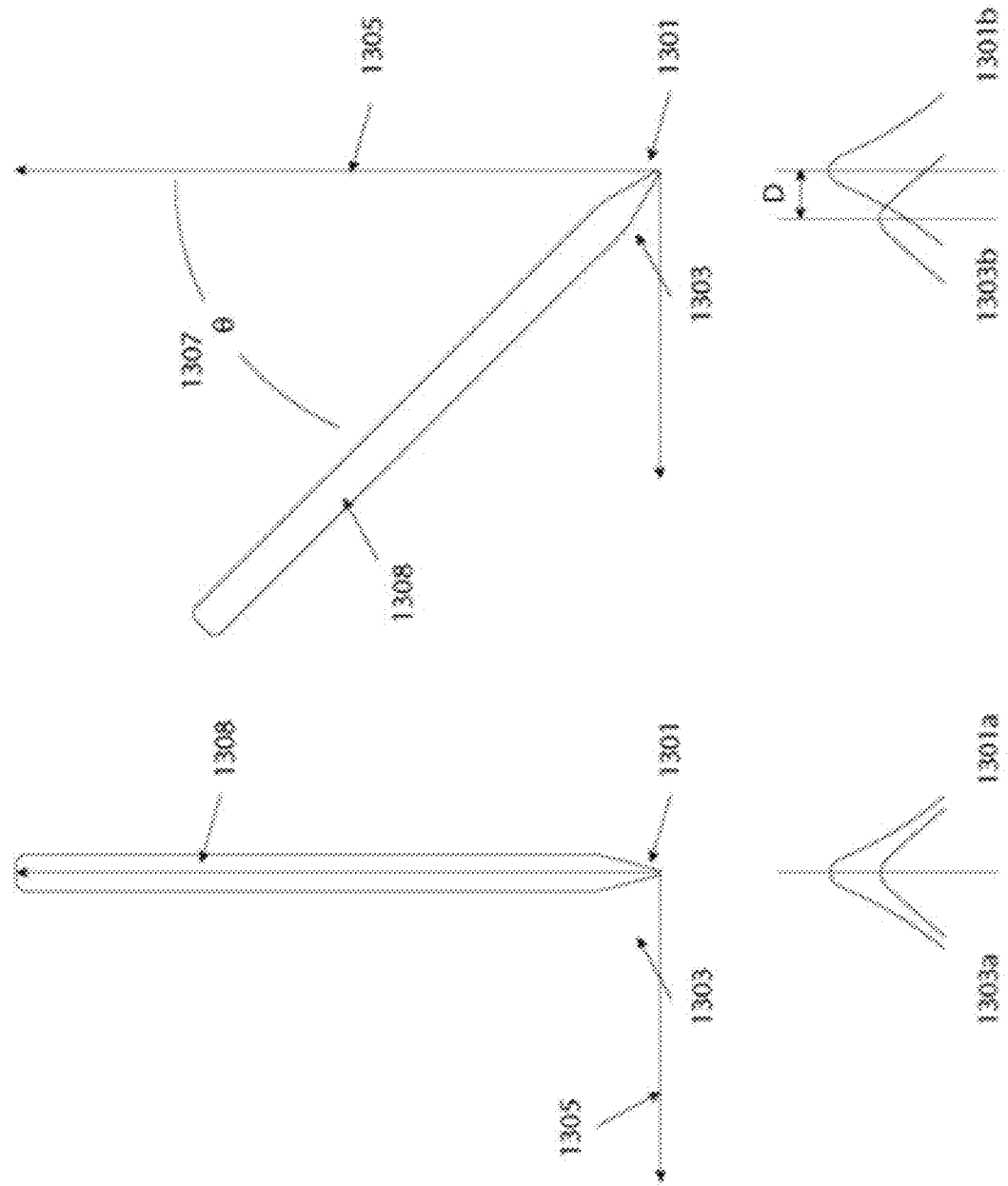

ACTIVE PEN-STYLUS PRECISE ERASER

CROSS-REFERENCE TO RELATED APPLICATIONS

The present application Ser. No. 18/779,149, entitled "Active Pen-Stylus Precise Eraser" is a continuation-in-part of U.S. application Ser. No. 18/208,280, filed on Jun. 11, 2023, which will issue on Jul. 23, 2024 as U.S. Pat. No. 12,045,404, the present application is owned by the Applicant of these applications: U.S. patent application Ser. No. 18/779,151, entitled "Replaceable Conductive Marker Tip", filed Jul. 22, 2024; U.S. patent application Ser. No. 18/779, 154, entitled "Advanced Paper Emulation," filed Jul. 22, 2024; U.S. patent application Ser. No. 18/779,158 entitled "Marker Protection System," filed Jul. 22, 2024; U.S. patent application Ser. No. 18/779,164 entitled "Marker Writing System," filed Jul. 22, 2024; and U.S. patent application Ser. No. 18/779,170 entitled "Captive Object Flexure Mechanism," filed Jul. 22, 2024, and all these applications are incorporated herein by reference in their entirety.

TECHNICAL FIELD

The disclosure relates generally to a pointing device, adapted for various coordinate input devices such as a digitizer or a tablet, which provide inputs to various types of computing systems. In particular, embodiments of the present invention relate to a pen-stylus constructed to provide an eraser function.

BACKGROUND

Mobile telephones, tablet computers, PCs, car entertainment systems, white goods and many other devices are commonly equipped with interactive displays. These interactive displays combine a display screen, such as an LCD, oLED, plasma or electrophoretic display (EPD), with an input system, such as a touch- or pen-stylus-input system. The input system recognizes the presence of an input object such as a pen-stylus touching or in proximity to the display screen. The device typically responds to such inputs by performing one or more functions, which may include changing what is shown on the display screen.

A "pen-stylus" (or "pen" or "stylus") is typically a pen- or pencil-shaped instrument whose position (e.g., tip position) on a computer monitor can be detected either electronically or physically. The pen-stylus enables users to perform tasks, such as drawing or making selections on a computing device. While devices with touchscreens such as some computers, mobile devices (smartphones and personal digital assistants), game consoles, and graphics tablets can often be operated with a fingertip, a pen-stylus typically provides more accurate and controllable input. In essence, a pen-stylus has a similar function as a mouse or touchpad as a pointing device but may enable much more precise inputs for certain drawing tasks. The use of a pen-stylus is sometimes termed "pen-stylus computing."

Conventional pen-styluses have typically been constructed to detect "pen-down" information in addition to coordinate information on the pointing device. Such pen-down information typically arises when the pen-stylus point is in contact with a panel of the digitizer. The pen-down information is conventionally detected by either force (e.g., pressure) sensitive means for detecting the vertical force applied to the pen-stylus point and/or detected by an electrical connection between the pen-stylus and the panel of the digitizer. The position data may be smoothed and/or de-noised before it is used to estimate the velocity and/or the acceleration of the input object. Such smoothing and/or de-noising may be done using an appropriate technique—for example, by applying a recursive Bayesian filter or smoothing, such as a Kalman filter, to the position data.

Active pen-styluses (also known as "active pen" or "digital styluses") include digital components and/or circuitry inside the pen-stylus that communicates with a digitizer on the touch device. This communication allows for advanced features such as force (e.g., pressure) sensitivity, tilt detection, programmable buttons, palm detection, eraser tips, memorizing settings and writing data transmission.

Active pen-styluses typically employ different protocols from different manufacturers in order to communicate with the digitizer of a graphic tablet or multi-touch device. For an active pen-stylus to function properly, its digital component protocol must typically match the digitizer technology in the touch screen with which it interacts. Thus, the digital protocol of the pen-stylus must be compatible with the device digitizer, otherwise input from the pen-stylus will not register on the device. Active pen-styluses are typically powered by a removable or chargeable battery.

A pen-stylus' performance is often measured by four characteristics: 1) comfort, 2) resistance, 3) balance and overall weight, and 4) precision. "Precision" can sometimes be a nebulous characteristic, so it is often described in terms of further characteristics, such as: 1) responsiveness and speed, 2) jitter, 3) tilt, 4) levels of force (e.g., pressure), and 5) palm rejection or detection. This last element of precision may prevent a touch device from registering or marking the screen when a hand or palm is resting on the screen surface. Effective operation may rely on a combination of technology in the pen-stylus, the operating system software and the screen digitizer technology for effective operation.

While pen-stylus technology has made great strides in recent years in improving pen-stylus technology, further improvements are still warranted. Moreover, specific use cases for pen-styluses may compel levels of precision and additional functionality not available in conventional devices.

SUMMARY OF THE INVENTION

Embodiments of the invention relate to a method for determining an area of erasure on a screen of a display device, the method comprising receiving in an active pen-stylus user drawing data input related to drawing on the screen of the display device and converting the drawing data to an electronic drawing data signal and also receiving the electronic drawing data signal in a first pen antenna circuit in the active pen-stylus that processes the electronic drawing data signal and sends the processed electronic drawing data signal to an active pen stylus antenna system. The processed electronic drawing data signal is transmitted from the active pen-stylus antenna system to the display device for display on the screen of the display device, the active pen-stylus antenna system comprising at least two antennas proximally located in a front portion of the active pen-stylus. User erasure data related to erasing at least a portion of the drawing on the screen of the display device is received in the active pen-stylus and the user erasure data is converted to an electronic erasure data signal. The electronic erasure data signal is received in a second pen antenna circuit in the active pen-stylus that processes the electronic erasure data signal and sends the processed electronic erasure data signal to an erasure antenna system, the eraser antenna system comprising at least two antennas, the eraser antenna system proximally located in a rear portion of the active pen-stylus, wherein a first antenna of the at least two antennas in the eraser antenna system has a different location in the rear of the active pen-stylus than a second of the at least two antennas in the eraser antenna system, wherein the processed electronic erasure data signal includes orientation data related to the first antenna and the second antenna of the at least two antennas in the eraser antenna system. The processed electronic erasure data signal from the erasure antenna system on the active pen-stylus is transmitted to the display device for erasing at least the portion of the drawing on the screen of the display device, wherein a graphics display component in the display devices uses the received processed electronic erasure data signal to compute a tilt angle between the first of the at least two antennas in the eraser antenna system and the second of the at least two antennas in the eraser antenna system to determine the area of erasure associated with the portion of the drawing on the screen of the computing device.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIGS. 13A-13B illustrate two transmitters 1301, 1303 in a marker's tip (e.g., the core 1102 shown in FIG. 11) of an active pen-stylus 1308 giving a computing device (e.g., the e-paper tablet 110) the ability to measure two distinct signals.

The figures depict various embodiments of the presented invention for purposes of illustration only. One skilled in the art will readily recognize from the following discussion that alternative embodiments of the structures and methods illustrated herein may be employed without departing from the principles described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality.

The figures depict embodiments of the disclosed system (or method) for purposes of illustration only. One skilled in the art will readily recognize from the following description that alternative embodiments of the structures and methods illustrated herein may be employed without departing from the principles described herein.

Overview

Disclosed is a configuration (including a system, a process, as well as a non-transitory computer readable storage medium storing program code) for calculating the tilt angle of the eraser on an active-pen stylus and then employing this tilt angle calculation to determine an area of erasure on a display associated with a computing device (e.g., a tablet computing device). Embodiments of the tilt angle erasure invention will be discussed beginning at FIG. 14A, following a description of the e-paper tablet device that interoperates with the marker having an eraser function and following a discussion of an active-pen stylus suitable for application with embodiments of the invention.

Example Tablet System and Configuration

Figure 1:
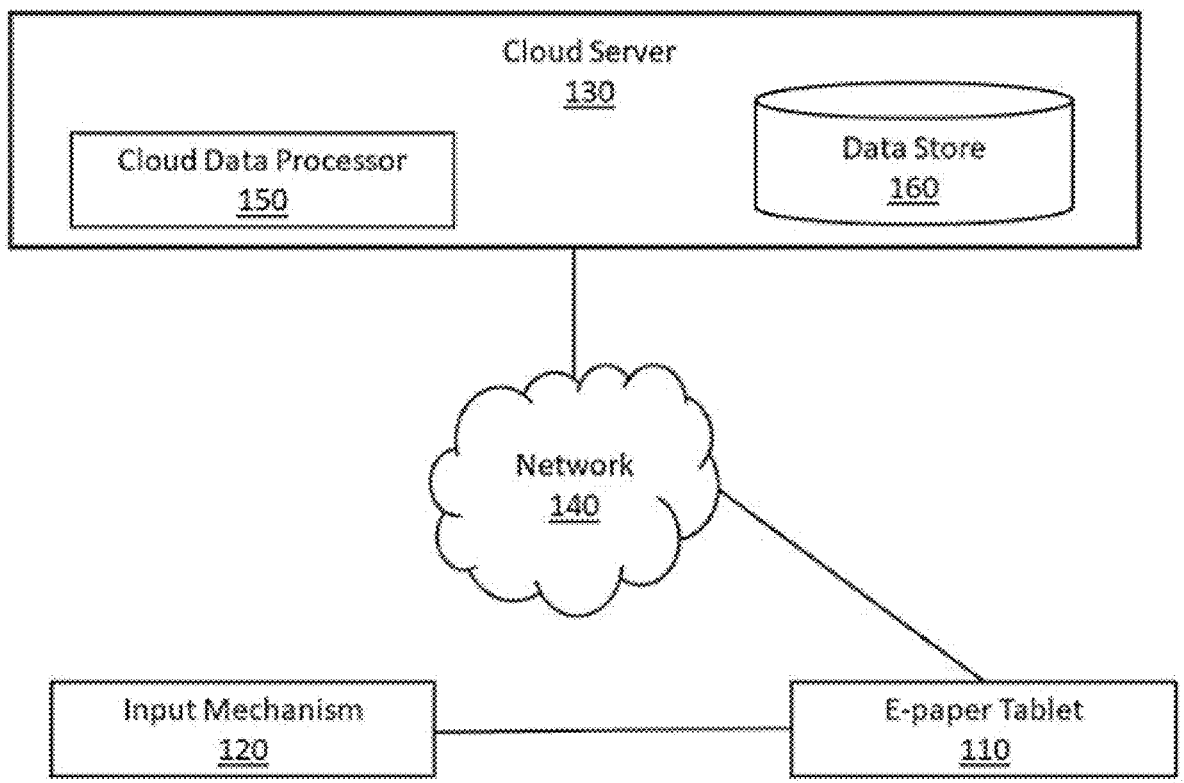
FIG. 1 illustrates a system architecture for an e-paper tablet device 110 that receives inputs from the input mechanism such as a pen-stylus, according to one example embodiment.

As shown in FIG. 1, an e-paper tablet device 110 receives inputs from the input mechanism 120, for example, when the input mechanism 120 makes physical contact with a contact-sensitive surface (e.g., the touch-sensitive screen) on the e-paper tablet device 110 as the user makes a gesture of some sort with the input mechanism 120. The input mechanism 120 may be a finger, pen-stylus or marker. The tablet device 110 here is referred to as an "e-paper tablet," a device that mimics the feeling of writing with ordinary pen and paper for users of the device. Such devices are also known as "electronic paper" and "electronic ink." Based on the nature of the contact, the e-paper tablet device 110 generates and executes instructions for updating content displayed on the contact-sensitive screen to reflect the gesture inputs. For example, in response to a gesture transcribing a verbal message (e.g., a written text or a drawing), the e-paper tablet device 110 updates the contact-sensitive screen to display the transcribed message. As another example, in response to a gesture selecting a navigation option, the e-paper tablet device 110 updates the screen to display a new page associated with the navigation option. While embodiments of the invention have been designed for e-paper systems, embodiments of the invention may also be suitable for other forms of computing devices capable of receiving and processing inputs from pen-stylus devices.

The input mechanism 120 may refer to any device or object that is compatible with the contact-sensitive screen of the e-paper tablet device 110, in particular a pen-stylus device, such as a so-called active pen device having its own power source or a static pen that receives its power from engagement with the contact-sensitive screen on the e-paper tablet device 110. In one embodiment, the input mechanism 120 may work with an electronic ink (e.g., E-ink) contact-sensitive screen. For example, the input mechanism 120 may refer to any device or object that can interface with a screen and, from which, the screen can detect a touch or contact of said input mechanism 120. Once the touch or contact is detected, electronics associated with the screen generate a signal which the e-paper tablet device 110 can process as a gesture that may be provided for display on the screen. Upon detecting a gesture by the input mechanism 120, electronics within the contact-sensitive screen generate a signal that encodes instructions for displaying content or updating content previously displayed on the screen of the e-paper tablet device 110 based on the movement of the detected gesture across the screen. For example, when processed by the e-paper tablet device 110, the encoded signal may cause a representation of the detected gesture to be displayed on the screen of the e-paper tablet device 110, such as a scribble. As mentioned, the input mechanism 120 may be a pen-stylus or another type of pointing device, including a part of a user's body, such as a finger.

In one embodiment, the input mechanism 120 is an encased magnetic coil. When in proximity to the screen of the e-paper tablet device 110, the magnetic coil helps generate a magnetic field that encodes a signal that communicates instructions, which are processed by the e-paper tablet device 110 to provide a representation of the gesture for display on the screen, e.g., as a marking. The input mechanism 120 may be force (e.g., pressure) and tilt-sensitive such that the system can make natural, visual response to both the pressure and tilt applied by the user. In turn, the interaction between the input mechanism and the contact-sensitive screen of the e-paper tablet device 110 may generate a different encoded signal for processing, for example, to provide for display a representation of the gesture on the screen that has different characteristics, e.g., thicker line marking. In alternate embodiments, the input mechanism 120 includes a power source (e.g., a battery) which can generate an electric field with a contact-sensitive surface. It is noted that the encoded signal is a signal that is generated and may be communicated. The encoded signal may have a signal pattern that may be used for further analog or digital analysis (or interpretation).

In one embodiment, the contact-sensitive screen is a capacitive touchscreen. The screen may be designed using a glass or polymer material coated with a conductive material. Electrodes, or an alternate current carrying electric component, are arranged along the coating of the screen (e.g., in a diamond-shaped cross hatch) to maintain a constant level of current running throughout the screen. A second set of electrodes are arranged horizontally. The matrix of vertical active electrodes and horizontal inactive electrodes generates an electrostatic field at each point on the screen. When an input mechanism 120 with conductive properties, for example the encased magnetic coil, a human finger, or something else that triggers the capacitive effect, is brought into contact with an area of the screen of the e-paper tablet device 110, current flows through the horizontally arranged electrodes, disrupting the electrostatic field at the contacted point on the screen. The disruption in the electrostatic field at each point that a gesture covers may be measured, for example as a change in capacitance, and encoded into an analog or digital signal.

In an alternate embodiment, the contact-sensitive screen is a resistive touchscreen. The resistive touch screen comprises two metallic layers: a first metallic layer in which striped electrodes are positioned on a substrate, such as a glass or plastic and a second metallic layer in which transparent electrodes are positioned. When contact from an input mechanism, for example a pen-stylus, finger, or palm, is made on the surface of the touchscreen, the two layers are pressed together. Upon contact, a voltage gradient is applied to the first layer and measured as a distance by the second layer to determine a horizontal coordinate of the contact on the screen. The voltage gradient is subsequently applied to the second layer to determine a vertical coordinate of the contact on the screen. The combination of the horizontal coordinate and the vertical coordinate register an exact location of the contact on the contact-sensitive screen. Unlike capacitive touchscreens which rely on conductive input mechanisms, a resistive touchscreen is configured to sense contact from nearly any input mechanism. Although some embodiments of the e-paper tablet device 110 are described herein with reference to a capacitive touchscreen, one skilled in the art would recognize that a resistive touchscreen could also be implemented.

In an alternate embodiment, the contact-sensitive screen is an inductive touchscreen. An inductive touchscreen comprises a metal front layer that is configured to detect deflections when contact is made on the screen by an input mechanism. Accordingly, an inductive touchscreen is configured to sense contact from nearly any input mechanism. Although some embodiments of the e-paper tablet device 110 are described herein with reference to a capacitive touchscreen, an ordinarily skilled artisan would recognize that alternative touchscreen technology may be implemented, for example, an inductive touchscreen could also be implemented.

The cloud server 130 is configured to receive information from the e-paper tablet device 110 and/or communicate instructions to the e-paper tablet device 110, according to some embodiments of the invention. As illustrated in FIG. 1, the cloud server 130 may comprise a cloud data processor 150 and a data store 160. Data recorded and stored by the e-paper tablet device 110 may be communicated via the network 140 to the cloud server 130 for storage in the data store 160. For example, the data store 160 may store documents, images, or other types of content generated or recorded by a user through the e-paper tablet device 110. In some embodiments, the cloud data processor 150 monitors the activity and usage of the e-paper tablet device 110 and communicates processing instructions to the e-paper tablet device 110. For example, the cloud data processor 150 may regulate synchronization protocols for data stored in the data store 160 with the e-paper tablet device 110.

Interactions between the e-paper tablet device 110 and the cloud server 130 are typically performed via the network 140, which enables communication between the e-paper tablet device 110 and the cloud server 130. In one embodiment, the network 140 uses standard communication technologies and/or protocols including, but not limited to, links using technologies such as Ethernet, 802.11, worldwide interoperability for microwave access (WiMAX), 3G, 4G, LTE, digital subscriber line (DSL), asynchronous transfer mode (ATM), InfiniBand, and PCI Express Advanced Switching. The network 140 may also utilize dedicated, custom, or private communication links. The network 140 may comprise any combination of local area and/or wide area networks, using both wired and wireless communication systems. The cloud server 130 may be alternatively implemented, and in some embodiments may be replaced by hardware and software that provide similar functionality while possibly not being considered a conventional cloud server.

Figure 2:
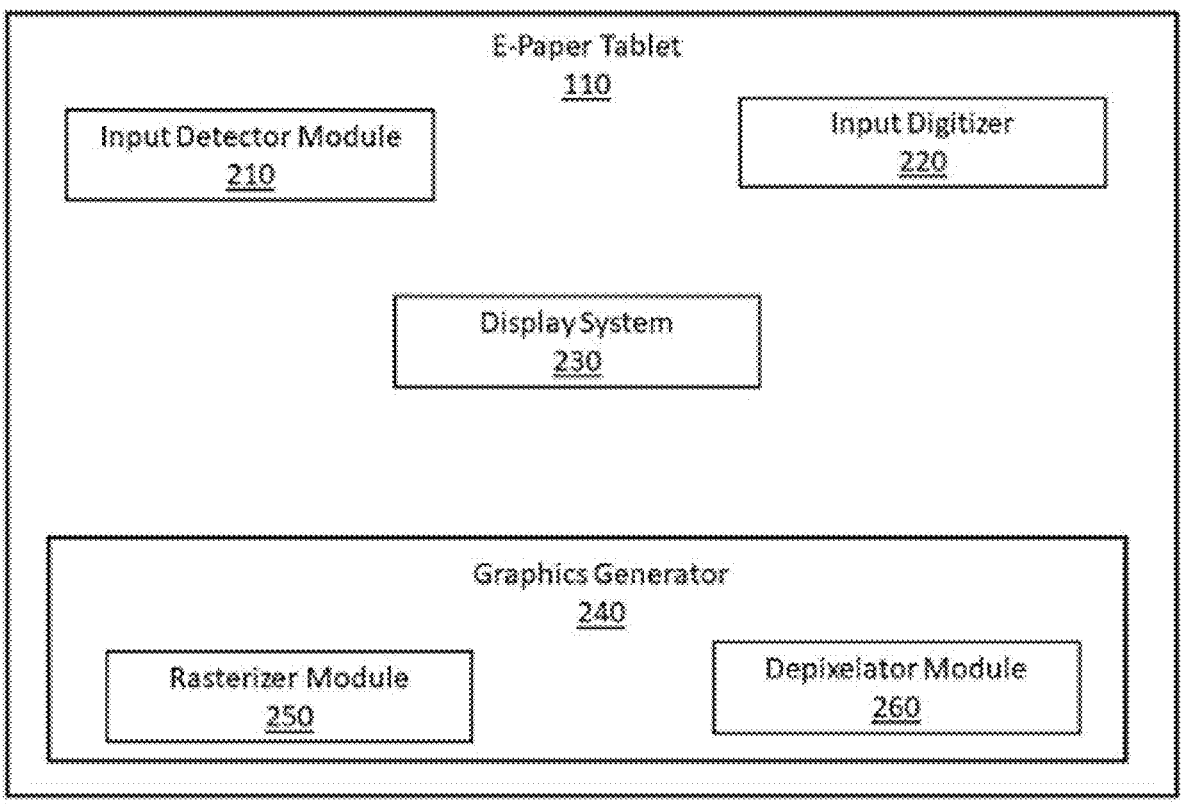
FIG. 2 is a block diagram of the system architecture of an e-paper tablet device 110, according to one example embodiment.

FIG. 2 is a block diagram of the system architecture of an e-paper tablet device 110, according to one example embodiment. In the embodiment illustrated in FIG. 2, the e-paper tablet device 110 comprises an input detector module 210, an input digitizer 220, a display system 230, and a graphics generator 240.

The input detector module 210 recognizes that a gesture has been or is being made on the screen of the e-paper tablet device 110. The input detector module 210 refers to electronics integrated into the screen of the e-paper tablet device 110 that are configured to interpret an encoded signal generated by contact between the input mechanism 120 and the screen into a recognizable gesture. To do so, the input detector module 210 may evaluate properties of the encoded signal to determine whether the signal represents a gesture made intentionally by a user or a gesture made unintentionally by a user.

The input digitizer 220 may be configured to convert the analog signal encoded by the contact between the input mechanism 120 and the screen into a digital set of instructions. The converted digital set of instructions may be processed by the e-paper tablet device 110 to generate or update a user interface displayed on the screen to reflect an intentional gesture.

The display system 230 may include the physical and firmware (or software) components to provide for display (e.g., render) on a screen a user interface. The user interface may correspond to any type of visual representation that may be presented to or viewed by a user of the e-paper tablet device 110.

Based on the digital signal generated by the input digitizer 220, the graphics generator 240 may be configured to generate or update graphics of a user interface to be displayed on the screen of the e-paper tablet device 110. The display system 230 may be configured to present those graphics of the user interface for display to a user using electronics integrated into the screen.

When an input mechanism 120 makes contact with a contact-sensitive screen of an e-paper tablet device 110, the input detector module 210 recognizes a gesture has been made through the screen. The gesture may be recognized as a part of an encoded signal generated by a pressure or force sensor in the input mechanism 120 and/or corresponding electronics of the screen of the display system 230. The encoded signal is transmitted to the input detector module 210, which evaluates properties of the encoded signal in view of at least one gesture rule to determine whether the gesture was made intentionally by a user. If the input detector module 210 determines that the gesture was made intentionally, the input detector module 210 communicates the encoded signal to the digitizer output. The encoded signal is an analog representation of the gesture received by a matrix of sensors embedded in the screen of the device 110.

In one example embodiment, the input digitizer 220 translates the physical points on the screen that the input mechanism 120 made contact with into a set of instructions for updating what is provided for display on the screen. For example, if the input detector module 210 detects an intentional gesture that swipes from a first page to a second page, the input digitizer 220 receives the analog signal generated by the input mechanism 120 as it performs the swiping gesture. The input digitizer 220 generates a digital signal for the swiping gesture that provides instructions for the display system 230 of the e-paper tablet device 110 to update the user interface of the screen to transition from, for example, a current (or first page) to a next (or second page, which may be before or after the first page).

In one example embodiment, the graphics generator 240 receives the digital instructional signal, such as a swipe gesture indicating page transition (e.g., flipping or turning) generated by the input digitizer 220. The graphics generator 240 generates graphics or an update to the previously displayed user interface graphics based on the received signal. The generated or updated graphics of the user interface are provided for display on the screen of the e-paper tablet device 110 by the display system 230, e.g., displaying a transition from a current page to a next page to a user. In the displayed embodiment of the FIG. 2, the graphics generator 240 comprises a rasterizer module 250 and a depixelator module 260. Input gestures drawn by a user on a contact-sensitive surface are received as vector graphics and are input to the rasterizer module 250. The rasterizer module 250 converts the input vector graphics to raster graphics, which can be displayed (or provided for display) on the contact-sensitive surface. The depixelator module 260 may apply image processing techniques to convert the displayed raster graphics back into vector graphics, for example to improve processing power of the e-paper tablet device 110 and to conserve memory of the e-paper tablet device 110. In at least one implementation, the depixelator module 260 may convert a displayed raster graphic back to a vector graphic when exporting content displayed on the screen into a different format or to a different system.

Further details about structures and functions of e-paper tablets and their graphical displays can be found in U.S. Pat. No. 11,158,097 to Martin Sandsmark and Gunnar Sletta entitled "Generating vector graphics by processing raster graphics" and in U.S. Pat. No. 10,824,274 to Sondre Hoff Dyvik, Martin Sandsmark, and Magnus Haug Wanberg, entitled "Interactive displays," both of which are incorporated by reference herein.

Figure 3:
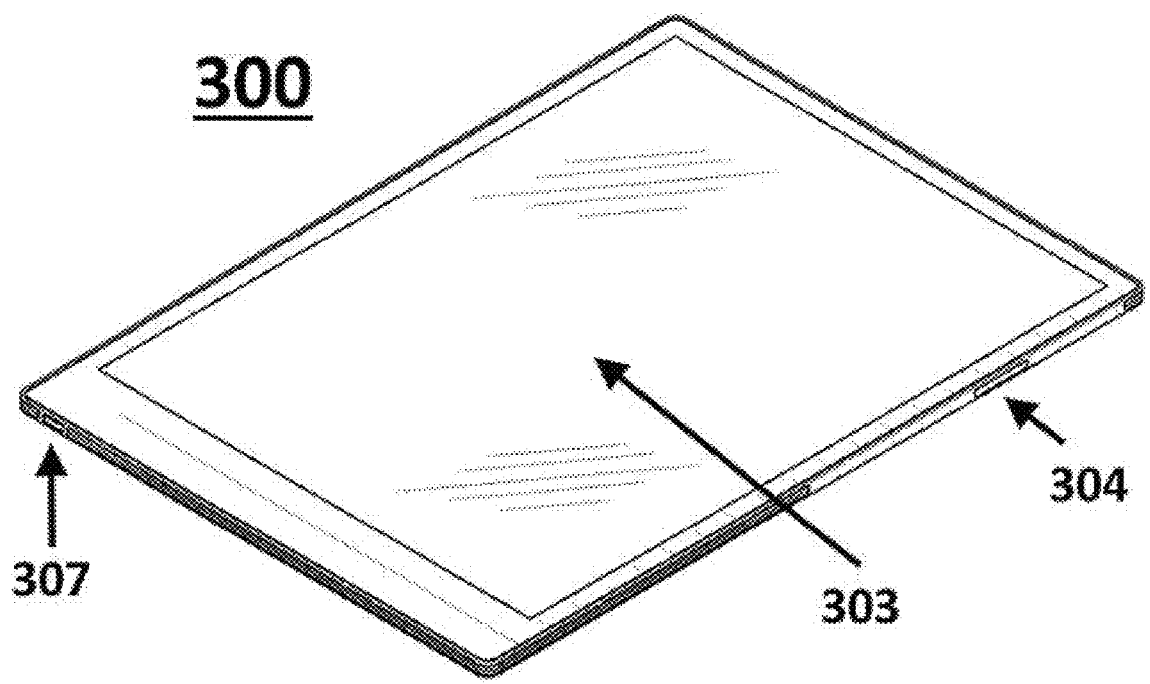
FIG. 3 illustrates a front and right perspective view of an e-paper tablet 300 having the functionality described for the e-paper tablet device 110 in FIGS. 1-2.

FIG. 3 illustrates a front and right perspective view of an e-paper tablet 300 having the functionality described for the e-paper tablet device 110 in FIGS. 1-2. Among other things, the e-paper table 300 includes a touch-sensitive display 303. The display 303 has been treated to provide a paper-feeling for users of the device when they engage with it using an input device 120. FIG. 3 also shows a charging area 304 for recharging the input device 120, when the input device is an active pen-stylus, according to an embodiment of the invention. Inside the e-paper tablet 300 near where the charging area 304 is located may be a set of magnets to hold the input device 120 in place while it is re-charging. FIG. 3 also shows a USB-c connector 307 that may be used to provide electrical power to the e-paper tablet 300, as well as transmitting various types of data into or out of the e-paper tablet 300. The e-paper tablet 300 also includes several actuators and other features that will be shown below in FIGS. 5-10.

Figure 4:
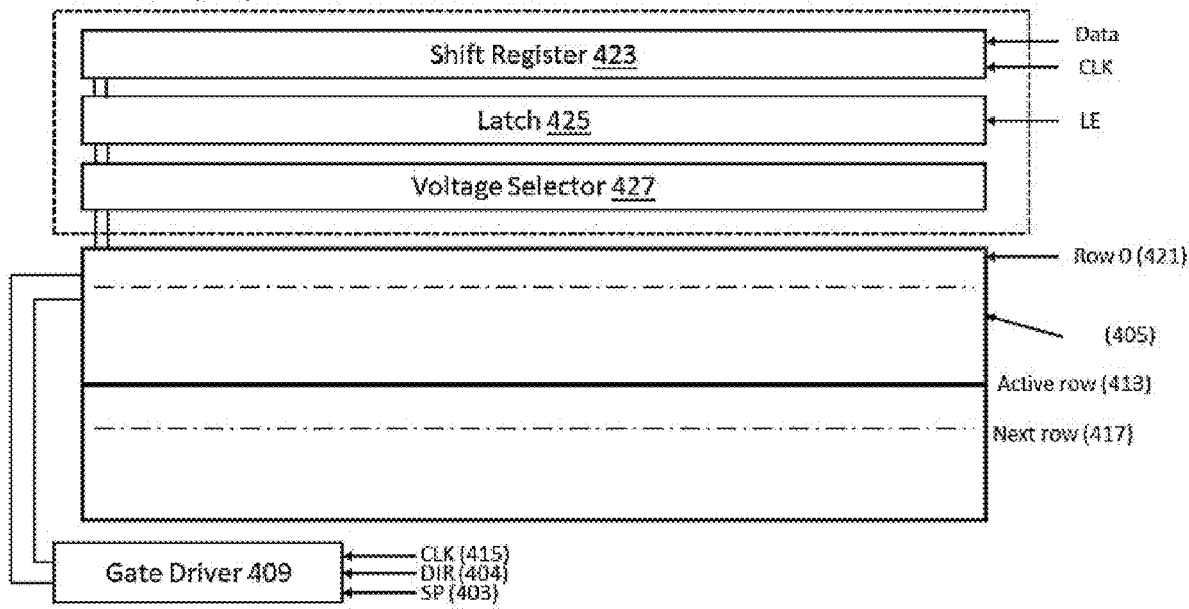
FIG. 4 illustrates hardware components of an example Electrophoretic Display (EPD) operating in an e-paper tablet device 110, according to one example embodiment.

FIG. 4 illustrates hardware components of an example Electrophoretic Display (EPD) in accordance with a disclosed embodiment. As discussed, a variety of display technologies may be employed, including EPDs, LCDs, and reflective LCDs (rLCDs). The specific display device deployed may be part of the display system 230 of the e-paper tablet device 110 shown in FIG. 2 and produce the images shown on the display 303 of the e-paper tablet 300 shown in FIG. 3. The EPD includes a gate driver 409, a source driver 411, a shift register 423 with data and clock signal line, a latch 425, a voltage selector 427, and rows making up a display 405. The EPD industry borrowed certain components and concepts from the LCD industry; however, these two devices have some fundamental differences as well. Of particular relevance here is the persistence of pixels in EPD displays. Unlike LCD displays, EPD displays do not require the frequent refreshing required in an LCD display. In an EPD display, once a neutral voltage is set for a pixel, the pixel will not change, for example, and will persist for a long period of time, especially relative to an LCD display.

As mentioned, Electrophoretic displays (EPDs) 405 have utilized many aspects of LCD production infrastructure and driving mechanisms. The driving electronics typically consist of a gate driver (GD) 409 and a source driver (SD) 411. The display 405 has multiple rows of pixels. Pixel values within a row may be changed, e.g., logic high voltage may be a "black" pixel and a logic low voltage or "ground" may be a no color pixel. The pixels in the EPD 405 function similarly to small capacitors that persist over long time intervals. An EPD pixel contains a large number of charged particles that are suspended in a liquid. If a charge is applied, the particles will move to a surface where they become visible. White and black particles have opposite charges such that a pixel's display may change from white to black by applying an opposite charge to the pixel. Thus, the waveforms applied to an EPD comprise long trains of voltages to change from black to white or vice versa. The EPD arts are also known to have the ability to apply variable voltage levels that mix the white and black particles to produce various shades of gray. Voltage levels in a pixel also may be tiered between to provide shades between no color and black (e.g., levels of grey). Groups of pixels around each other may form a region that provides some visible characteristic to a user, e.g., an image on a screen, e.g., of the display system 230 of the e-paper tablet device 110.

To change pixel values in a region, a scan of a display 405 will conventionally start at a top row, e.g., row 0 421, and apply voltages to update pixels within a particular row where pixels need to be changed to correspond with the image that is displayed. In this example, a start pulse (GDSP) 403 can be used to reset the driver 411 to row 0 421. A row-by-row selection is made by driving the driver gate 409 to select a row, e.g., active row 413. All pixels in one row are addressed concurrently using data transferred to the display. Latch 425 receives from the shift register 423 the next set of voltages to be applied to a row of pixels. When the scan of the active row is completed and, if necessary, pixels changed or updated, a clock pulse (GDCLK) 415 is issued to the driver gate 409 to change to the next row 417 for a scan. A direction indication (DIR) 404 may change/reset the direction of the display updates.

As mentioned above, an ordinary artisan will recognize that a similar function can be accomplished also with a standard LCD, OLED, MicroLED or other type of display, and the description of EPD technology is provided here merely for illustration of one embodiment of the invention.

The source driver 411 is used to set the target voltage for each of the pixels/columns for the selected row. It consists of a shift register 423 for holding the voltage data, a latch circuit 425 for enabling pixel data transfer while the previous row is being exposed, and a voltage selector (multiplexer) 427 for converting the latched voltage selection into an actual voltage. For all rows to be updated all the voltage values have to be shifted into the register 423 and latched for the voltages to be available.

Figure 5:
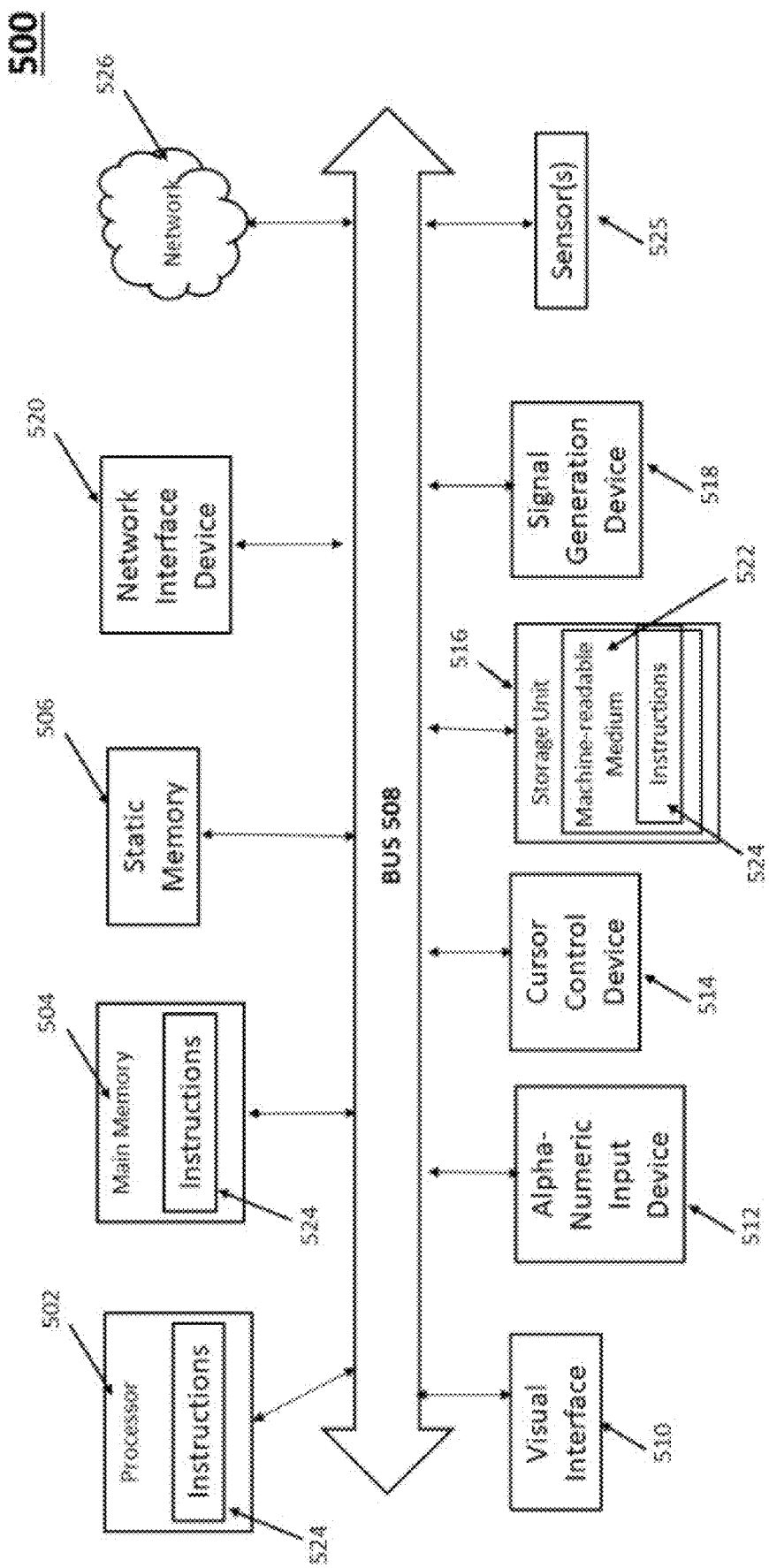
FIG. 5 is a block diagram illustrating components of an example machine able to read instructions from a machine-readable medium and execute them in a processor (or controller), according to one example embodiment.

FIG. 5 is a block diagram illustrating components of an example machine able to read instructions from a machine-readable medium and execute them in a processor (or controller), according to one embodiment. In this example, FIG. 5 shows a diagrammatic representation of a machine in the example form of a computer system 500 (e.g., the computing portions of the e-paper tablet 111 shown in FIG. 1) within which program code (e.g., software) for causing the machine to perform any one or more of the methodologies discussed herein may be executed. The e-paper tablet device 110 may include some or all of the components of the computer system 500. The program code may be comprised of instructions 524 executable by one or more processors 502. In the e-paper tablet system 110, the instructions may correspond to the functional components described in FIGS. 1, 2, and 4. FIG. 5 is an example of a processing system, of which a some of the described components or all of the described components may be leveraged by the modules described herein for execution.

While the embodiments described herein are in the context of the e-paper tablet system 110, it is noted that the principles may apply to other touch sensitive devices. In those contexts, the machine of FIG. 5 may be a server computer, a client computer, a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processors 502 (e.g., a central processing unit (CPU), one or more graphics processing units (GPU), one or more digital signal processors (DSP), one or more application specific integrated circuits (ASICs), one or more radio-frequency integrated circuits (RFICs), or any combination of these), a main memory 504, and a static memory 506, which are configured to communicate with each other via a bus 508. The computer system 500 may further include visual display interface 510. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen or display screen. The visual interface 510 may include or may interface with a touch enabled screen, e.g., of the e-paper tablet system 110 and may be associated with the display system 230. The computer system 500 may also include an input device 512 (e.g., a pen-stylus, a keyboard, or touch screen keyboard), a cursor control device 514 (e.g., a mouse, a trackball, a joystick, a motion sensor, or other pointing instrument), a storage unit 516, a signal generation device 518 (e.g., a speaker), and a network interface device 520, which also are configured to communicate via the bus 508.

The storage unit 516 includes a machine-readable medium 522 on which is stored (or encoded) instructions 524 (e.g., software) embodying any one or more of the methodologies or functions described herein. The instructions 524 (e.g., software) may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 (e.g., software) may be transmitted or received over a network 426 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., instructions 524) for execution by the machine and that cause the machine to perform any one or more of the methodologies disclosed herein. The term "machine-readable medium" includes, but not be limited to, data repositories in the form of solid-state memories, optical media, and magnetic media.

The computer system 500 also may include the one or more sensors 525. Also note that a computing device may include only a subset of the components illustrated and described with FIG. 5. For example, an IoT device may only include a processor 502, a small storage unit 516, a main memory 504, a visual interface 510, a network interface device 520, and a sensor 525.

Representative E-Paper Tablet

Figure 6:
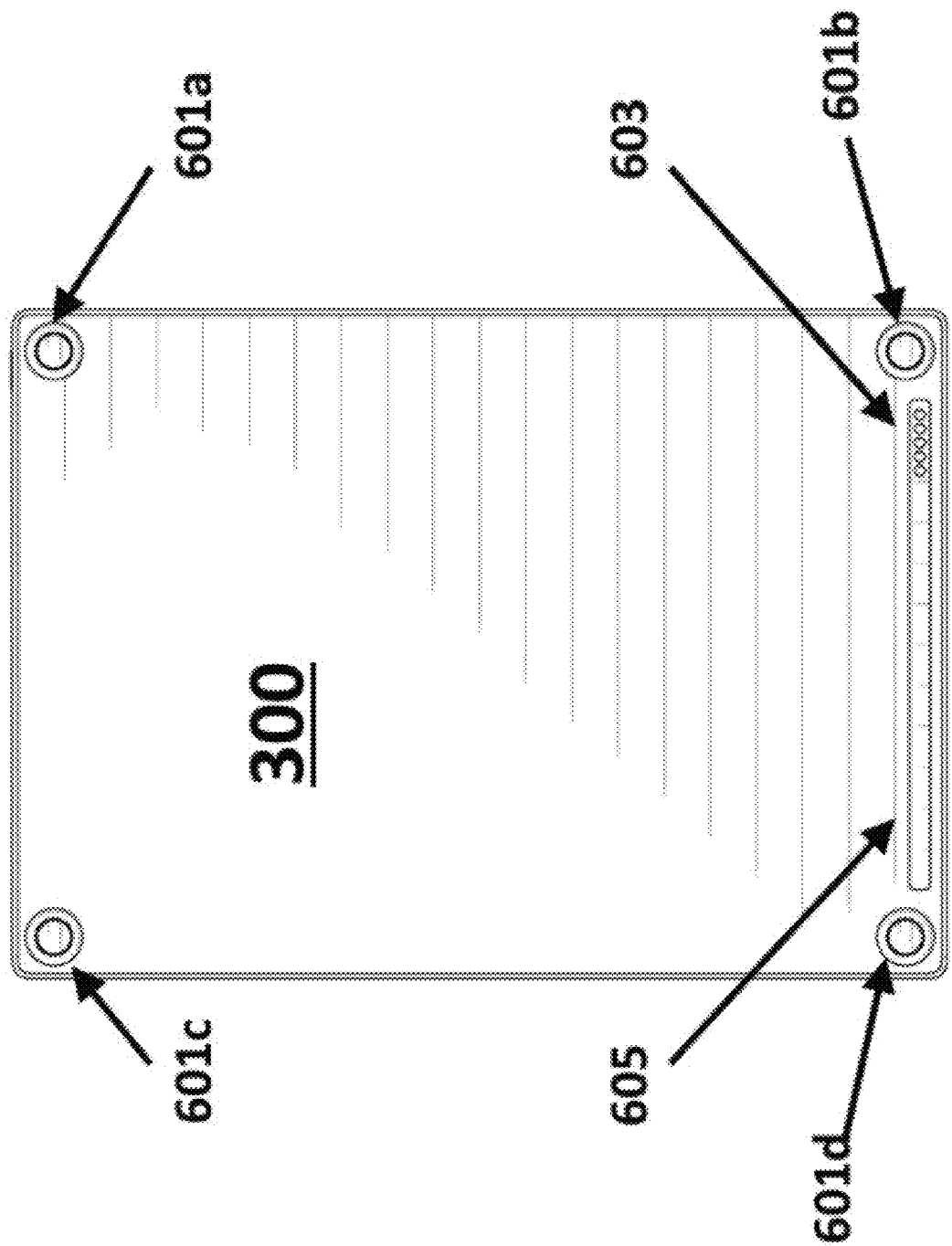
FIG. 6 illustrates a rear view of the e-paper tablet 300 showing volcano fee 601a-601d, a pogo pad 603, and an antenna region 605, according to an embodiment of the invention.

FIG. 3 provided a representative view of an e-paper tablet 300, resembling the e-paper 110 shown in FIGS. 1-2. FIG. 6 illustrates a rear view of the e-paper tablet 300 showing volcano fee 601a-601d, a pogo pad 603, and an antenna region 605, according to an embodiment of the invention. The antenna region 605 resides outside and above the location for a main antenna (e.g., an antenna on the e-paper tablet 110 that communicates with the cloud server 130 shown in FIG. 1 and which may generate the e-paper tablet's beacon signal discussed below) for the e-paper tablet 300, allowing the e-paper tablet device 300 to connect to the Internet, for example. The pogo pad 603 allows the e-paper tablet device 300 to connect to other devices, such as a folio device having a keyboard, for example.

Figure 7:
FIG. 7 illustrates a top view of the e-paper tablet device 300 showing volcano feet 601a, 601d, and a power button 701, according to an embodiment of the invention.

FIG. 7 illustrates a top view of the e-paper tablet device 300 showing volcano feet 601a, 601d, and a power button 701, according to an embodiment of the invention.

Figure 8:
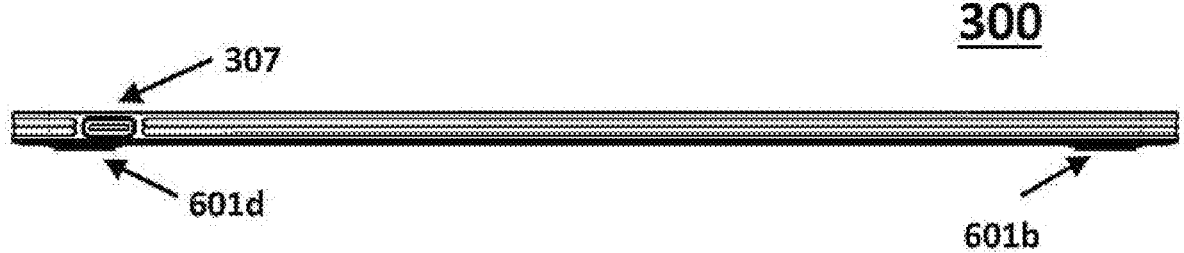
FIG. 8 illustrates a bottom view of the e-paper tablet device 300 showing volcano feet 601b, 601d and the USB-c connector 307, according to an embodiment of the invention.

FIG. 8 illustrates a bottom view of the e-paper tablet device 300 showing volcano feet 601b, 601d and the USB-c connector 307, according to an embodiment of the invention.

Figure 9:
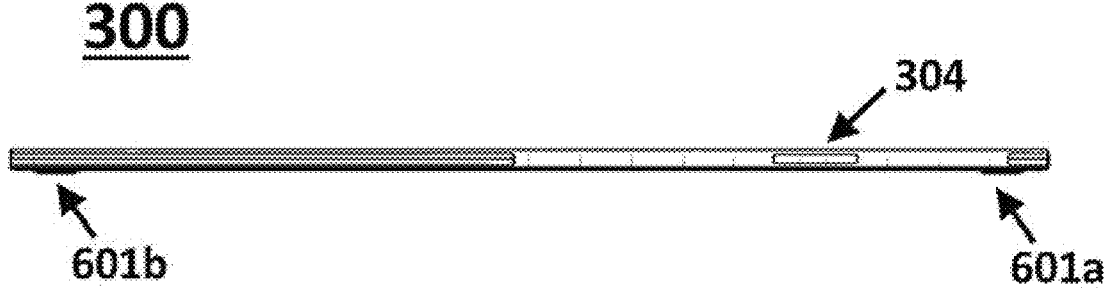
FIG. 9 illustrates a right view of the e-paper tablet device 300 showing volcano feet 601b, 601a, and the charging area 304 for recharging the input device 120, when the input device is an active pen-stylus, according to an embodiment of the invention.

FIG. 9 illustrates a right view of the e-paper tablet device 300 showing volcano feet 601b, 601a, and the charging area 304 for recharging the input device 120, when the input device is an active pen-stylus, according to an embodiment of the invention. Inside the e-paper tablet 300 near where the charging area 304 is located may be a set of magnets to hold the input device 120 in place while it is re-charging.

Figure 10:
FIG. 10 illustrates a left view of the e-paper tablet device 300 showing volcano feet 601c, 601d, according to an embodiment of the invention.

FIG. 10 illustrates a left view of the e-paper tablet device 300 showing volcano feet 601c, 601d, according to an embodiment of the invention.

Example Active Pen in Operation

An active pen-stylus (or more commonly "active pen") is a pen-stylus input device that allows users to write, sketch, draw, and/or perform other tasks on the display of the computing device, e.g., the e-paper tablet 110. An active pen-stylus includes digital components and/or circuitry that communicate with the computing device, e.g., the e-paper tablet 110. This communication enables advanced features such as force (e.g., pressure) sensitivity, tilt detection, programmable buttons, palm detection, eraser tips, memorizing settings, and writing data transmission. Viewed more expansively, communications between the computing device and the active pen-stylus enable a wide mix of peripheral sensors to be placed in the active pen-stylus with the resulting data reported to the computing device, e.g., the e-paper tablet. Such sensors placed in the active pen-stylus may range from simple buttons to accelerometers to enhanced artificial intelligence features.

An active pen's electronic components typically include a power source that may enable the device's electronics to provide lower latency and greater fidelity than other pen types, e.g., a passive pen. Active pens provide a number of advantages over passive pens, including hover latency, e.g., an active pen may typically be activated by merely being in proximity to a display, e.g., the display associated with the e-paper tablet 110.

Once the active pen touches or contacts a display screen of a device like an e-paper tablet, electronics associated with the display screen generates a signal which the e-paper tablet (e.g., the e-paper tablet 110) can process as a gesture made by the user. Upon detecting the gesture by the pen-stylus, electronics within the contact-sensitive screen generates a signal that encodes instructions for displaying content or updating content previously displayed on the screen of the e-paper tablet device based on the movement of the detected gesture across the screen.

In contrast with an active pen, a passive pen typically has no internal power source. A passive pen remains in an inactive state until the pen touches a device screen (e.g., a tablet device screen) causing a signal to pass from the device through the passive stylus and back to the device. The electronics associated with a passive pen may be integrated into the pen-stylus device or even provided in a small cartridge that is placed inside a pen-shaped stylus cover designed to better suit human ergonomics than the small cartridge containing the electronics and other components.

Figure 11:
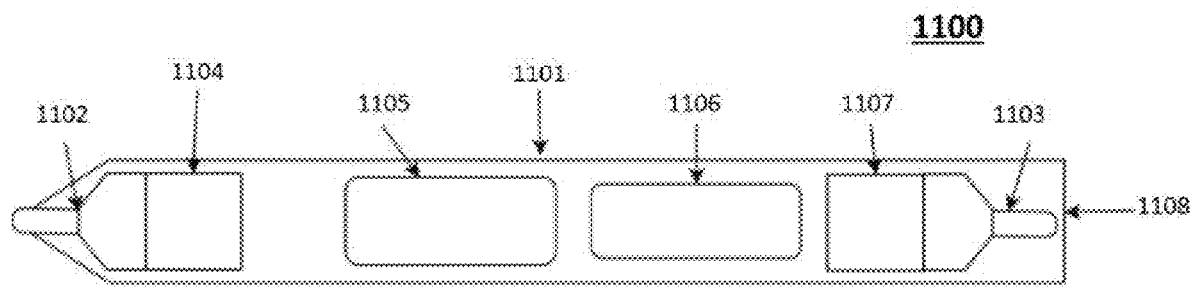
FIG. 11 illustrates a pen-stylus 1100 suited for application in at least one embodiment of the invention.

FIG. 11 illustrates an active pen-stylus 1100 that comprises a core member 1102 that itself comprises one or more antennas configured for communications with a tablet device, such as the e-paper tablet 110. The active pen-stylus 1100 may include one or more force sensing (e.g., pressure sensing) systems 1104 that detect force, e.g., the forces exerted on a display of an e-paper tablet 110 by a user operating the active pen-stylus 1100. The active pen-stylus 1100 may also help emulate human interaction with conventional writing utensils like pencil and paper, e.g., render "a pencil and paper stack feeling". The active pen-stylus 1100 also includes a power source, e.g., a battery 1106. Among other things, the battery 1106 allows the active pen-stylus 1100 to support a "hover" function that allows the active pen-stylus 1100 to enter a sleep state for battery charge preservation when it is not actively engaged with the display of the e-paper tablet 110 and to wake up from the sleep state when a core member (e.g., the core member 1102) detects a proximity to the display of the e-paper tablet 110. The active pen-stylus 1100 might not actually draw lines (or erase lines) on the display of the e-paper tablet 110 until a tip of the active pen-stylus 1100 physically touches the display of the e-paper tablet 110, according to an embodiment of the invention.

An active pen 1100 conventionally comprises a PCBA 1105 which includes electronic components needed for driving the signal lines associated with its core member (e.g., the core member 1102). The PCBA 1105 could alternatively be provided as a flexible printed circuit (FPC). The PCBA 1105 may include an appropriate active pen PCBA or IC/ASIC/MCU that processes data received from the force sensing system 1104 for sensing force or displacement pressure with high resolution sensing of the force during the interaction between the active pen 1100 and an object, e.g., the surface of the computing device, such as the e-paper tablet 110). (For example, the elements 1601 and 1625 shown in FIG. 16 could be a part of the PCBA 1105.) The PCB 1105 may also process data (e.g., typically related to erasures) received from the core member 1103, that itself comprises one or more antennas configured for communications with a tablet device, and the force sensing system 1107 for both simple or advanced force (e.g., pressure) sensing with high resolution sensing of the force (e.g., pressure) level during the interaction between the active pen 1100 and the surface of the computing device (e.g., the e-paper tablet 110).

The active pen 1100 may serve as the input mechanism 120 described in FIG. 1 that provides data input to the e-paper tablet 110, which may result in a drawing appearing (or being erased) on the display of the e-paper tablet 110. In operation, the force sensing system 1104 receives physical forces imparted to a marker tip of the active pen 1100 (e.g., the marker tip 1202 shown in FIG. 12) when the marker tip engages with a display on a tablet device (e.g., the e-paper tablet 110) and translates the physical force received into an electronic signal that is transmitted to the PCBA 1105 whose electronic components may perform a variety of processes on the signals received. The PCBA 1105 may then transmit the signals back to the tablet device (e.g., the e-paper tablet 110) for further action (e.g., drawing a line).

The active pen 1100 may also include an erasure system that receives user input data (e.g., instructions) related to erasing portions of a display on the screen of the associated computing device, e.g., the e-paper tablet 110, according to an embodiment of the invention. In embodiments where a secondary antenna system in the active pen 1100 enables tail eraser functionality, the active pen 1100 also comprises a second antenna system (e.g., core 1103), which enables the active pen 1100 to transmit and receive signals with the computing device (e.g., the e-paper tablet 110) through the tail eraser portion of the active pen 1100 near a cap 1108. In this embodiment, the active pen 1100 also includes a second force (e.g., pressure) sensing system 1107 that controls the force (e.g., pressure) imparted to the display of the computing device from the erasure activity. In a sense, the erasure system operates as an almost inverse active pen-stylus system, e.g., where one draws, the other erases. Likewise, the PCBA 1105 may include an appropriate active pen PCBA or IC/ASIC/MCU that process data associated with erasure functionality received from the second antenna system (e.g., core 1103).

The active pen 1100 also typically includes an external casing 1101 as a pen-stylus holder, typically formed in a cylindrical shape and made of non-metal material such as a plastic that contains the internal electronics within the casing 1101. The top end of the casing 1101 may be provided with the cap 1108.

Figure 12:
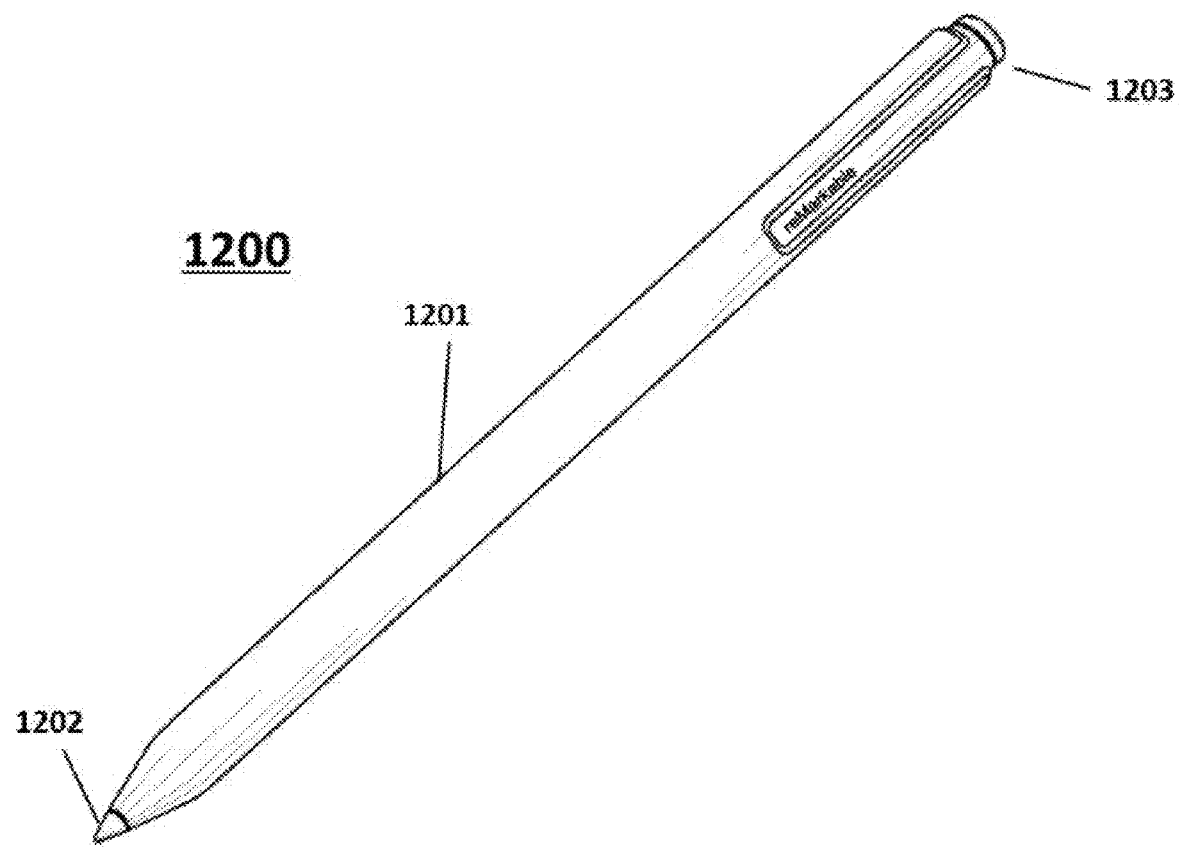
FIG. 12 illustrates an external casing 1201 for a pen-stylus 1200 designed to fit a user's hand, according to an embodiment of the invention.

FIG. 12 illustrates an external casing 1201 for a pen-stylus 1200 designed to fit a user's hand, according to an embodiment of the invention. The pen-stylus 1200 includes a marker tip 1202 and an eraser 1203. The marker tip 1202 operates as a part of the core member 1102 shown in FIG. 11, and the eraser 1203 operates as part of the second core (antenna) system 1103 shown in FIG. 11.

When an active pen-stylus (e.g., the pen-stylus 1100 and/or the pen-stylus 1200) includes multiple antennas as part of the core (e.g., the core 1102), then the pen-stylus may provide additional capabilities. As shown in FIGS. 13A-13B, employing two separate transmitters 1301, 1303 in the marker tip (e.g., the core 1102 shown in FIG. 11) of the active pen-stylus 1308 gives the computing device (e.g., the e-paper tablet 110) the ability to measure two distinct signals (illustrated in FIG. 13A as 1301$a$, 1303$a$ and illustrated in FIG. 13B as 1301$b$, 1303$b$). By knowing the antenna separation in the input device (e.g., the active pen-stylus 1308), the input digitizer 220 in a larger computing device, such as the e-paper tablet 110, can derive the active pen-stylus tilt angle θ 1307 relative to the computing device (e.g., the e-paper tablet 110). The input digitizer 220 is conventionally able to process active pen-stylus tilt information related to the drawing portion of the active pen-stylus. Only a slight change needs to be made to the input digitizer 220 for it to process tilt angle data related to an eraser (if erasure functionality if provided) to cause a change to the display on the e-paper tablet 110.

As seen in FIG. 13A, the signals 1301a, 1303a from the two antennas 1301, 1303 coincide when the active pen-stylus 1308 is perpendicular to the graphics display of the computing device (as shown by the grid 1305 and the line passing through the centers of both signals 1301a, 1303a). In contrast, FIG. 13B illustrates the active pen-stylus 1308 tilted by an angle θ 1307 relative to the display of the computing device (e.g., the e-paper tablet 110) as shown by the grid 1305 and the distance D marking the distance between the two centers of signals 1301b, 1303b. With such a tilt, the signals 1301b, 1303b from the two antennas 1301, 1303 are not aligned and are separated by the distance D. This distance D may be used to determine the corresponding drawing amount performed by the e-paper tablet device 110 on the display.

The method for deriving the tilt angle θ 1307 of the active pen-stylus 1308 is known when using two antennas (e.g., two separate antennas in the antenna system 1102 shown in FIG. 11, presented in FIGS. 13A and 13B as antennas 1301, 1303). The distance between antenna 1301 and antenna 1303 is fixed and known. This known separation, combined with basic trigonometry, can be employed in active pen tip antenna systems to derive the tilt angle for the active pen-stylus tip (e.g., the angle of the tip of the core member 1102 shown in FIG. 11 relative to the display 230 shown in FIG. 2 on the e-paper tablet 110). Thus, in one embodiment of the invention, as the tilt angle θ increases, the shading area proportionately increases on the display. One could similarly imagine a slightly different arrangement of the components such that as the tilt angle θ decreased, the area of marking area proportionately increased, e.g., in inverse proportion. In both embodiments, the area of marking still has a direct correlation to the tilt angle θ, e.g., as the tilt angle changes, the area of marking changes.

This tilt angle determination may operate in a similar manner for an erasure function in a pen-stylus, e.g., the pen-stylus 1100 shown in FIG. 11. Embodiments of the invention allow for the derivation of the tilt angle of the tail eraser by employing an electronically calculated method in the input digitizer 220 similar to that employed conventionally by the input digitizer 220 for determining the tilt of the marker tip and the eraser function, when present. Such a calculation requires that the pen-stylus (e.g., the pen-stylus 1100) to provide additional data/information to the input digitizer 220.

Figure 14B:
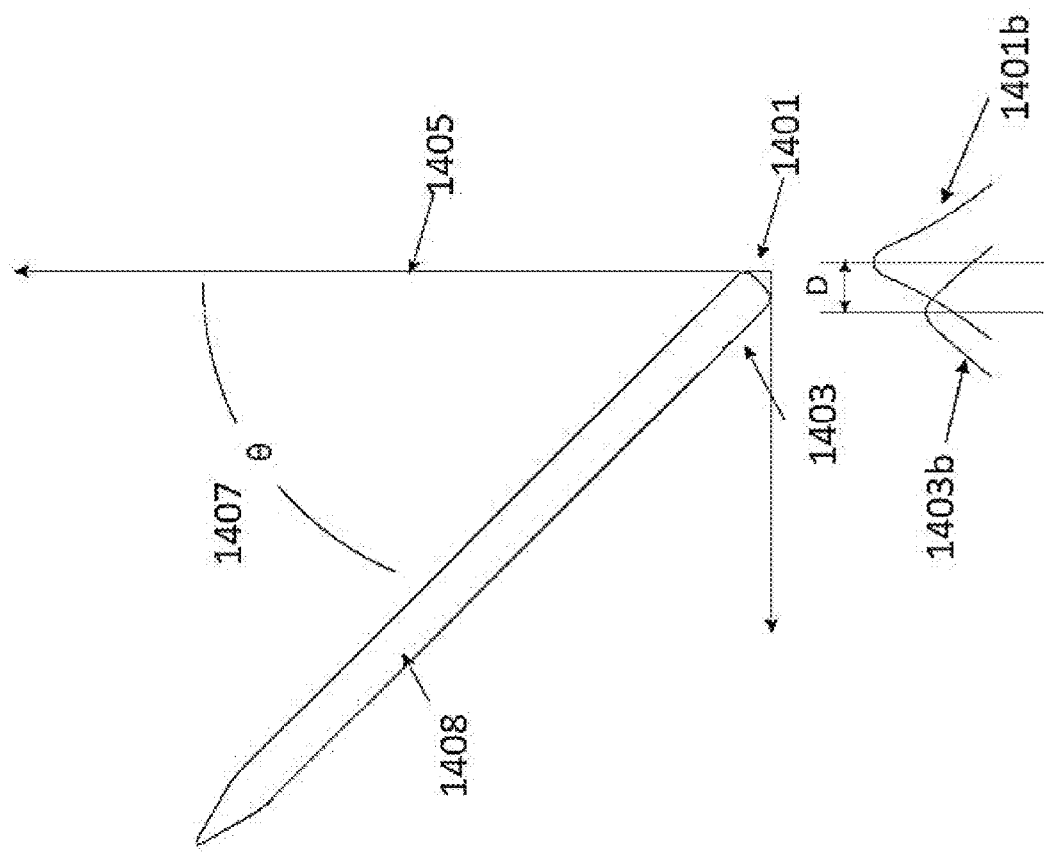
FIGS. 14A-14B illustrate an active pen-stylus 1408 that employs two separate transmitters 1401, 1403 in a rear of the active pen-stylus 1408 to assist in the measurement of the pen-stylus' tilt angle relative to the surface of a display of the e-paper tablet device, according to at least one embodiment of the invention.
Figure 14A:
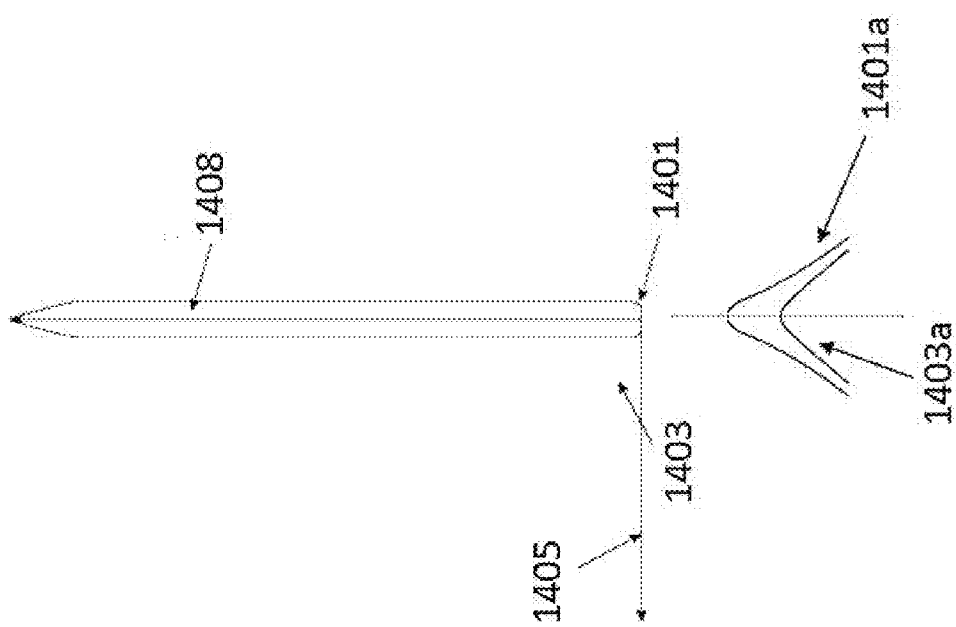

As shown in FIGS. 14A-14B, employing two separate transmitters 1401, 1403 in the tail eraser part (e.g., the core 1103 shown in FIG. 11) of an active pen-stylus 1408 gives the computing device (e.g., the e-paper tablet 110) the ability to measure two distinct signals (illustrated in FIG. 14A as 1401a, 1403a and illustrated in FIG. 14B as 1401b, 1403b). By knowing the antenna separation in the input device (e.g., the active pen-stylus 1408), the input digitizer 220 in a larger computing device, such as but not limited to the e-paper tablet 110, can derive the active pen-stylus tilt angle θ 1407 relative to the computing device (e.g., the e-paper tablet 110). As discussed, the input digitizer 220 is conventionally able to process active pen-stylus tilt information related to the drawing portion of the active-pen stylus. As such only a slight change needs to be made to the input digitizer 220 for it to process eraser tilt angle data to cause a change to the display on the e-paper tablet 110. As seen in FIG. 14A, the signals 1401a, 1403a from the two antennas 1401, 1403 coincide when the active pen-stylus 1408 is perpendicular to the graphics display of the computing device (as shown by the grid 1405 and the line passing through the centers of both signals 1401a, 1403a). In contrast, FIG. 14B illustrates the active pen-stylus 1408 tilted by an angle θ 1407 relative to the display of the computing device (e.g., the e-paper tablet 110) as shown by the grid 1405 and the distance D marking the distance between the two centers of signals 1401b, 1403b. With such a tilt, the signals 1401b, 1403b from the two antennas 1401, 1403 are not aligned and are separated by the distance D. This distance D may be used to determine the amount of erasure performed by the e-paper tablet device on the display.

The method for deriving the tilt angle θ 1407 of the active pen-stylus 1408 is known when using two antennas (e.g., two separate antennas in the core (antenna) system 1103 shown in FIG. 11, presented in FIGS. 14A and 14B as antennas 1401, 1403). The distance between antenna 1401 and the antenna 1403 is fixed and known. This known separation, combined with basic trigonometry, can be employed in active pen tip antenna systems to derive the tilt angle for the active pen-stylus tip (e.g., the angle of the tip of the core member 1103 shown in FIG. 11 relative to the display 230 shown in FIG. 2 on the e-paper tablet 110). Thus, in one embodiment of the invention, as the tilt angle θ increases, the area of erasure proportionately increases. One could similarly imagine a slightly different arrangement of the components such that as the tilt angle θ decreased, the area of erasure proportionately increased, e.g., in inverse proportion. In both embodiments, the area of erasure still has a direct correlation to the tilt angle θ, e.g., as the tilt angle changes, the area of erasure changes.

Antennas 1301, 1303 shown in FIGS. 13A-13B and antennas 1401, 1403 may send a clear signal to the e-paper tablet 110. This arrangement is particularly helpful if/when one of the antennas is in physical contact with the display of the e-paper tablet 110. When the pen-stylus 1308 (FIG. 13A-13B) or 1408 (FIGS. 14A-14B) is not in contact (e.g., out of range) with the tablet (e.g., the e-paper tablet 110), antennas on the tablet periodically send a beacon signal. This beacon signal is meant for the pen-stylus 1308 or pen-stylus 1408 to detect that it is within range of the tablet. In a time following the beacon signal, the tablet typically keeps an open time slot for the pen-stylus 1308 or pen-stylus 1408 to acknowledge the beacon and respond to the tablet. This acknowledgement initiates the two-way communication between the pen-stylus 1308 or pen-stylus 1408 and the tablet (e.g., the e-paper tablet 110). As an ordinary artisan will recognize, the "beacon" from the tablet is a form of an uplink to the pen-stylus 1308 or pen-stylus 1408, and the communication from the pen-stylus 1308 or pen-stylus 1408 to the tablet is a form of a downlink. There are a number of methods by which the larger computing device (e.g., the e-paper tablet 110) can determine whether the pen-stylus 1308/1408 is oriented upward (e.g., marker tip closest to the display device screen) or downward (e.g., erasure area closest to the display device), such as, but not limited to additional data from accelerometers in the pen-stylus 1308/1408, determination of antenna signal strength, limited transmission range for the antennas, identification information for the antennas, among other possible approaches.

Example Precise Eraser

As discussed, active pen-styluses, such as the stylus 1100 shown in FIG. 11, may be equipped with an eraser (or "electronic eraser" or "precise eraser" or "pseudo eraser"), often located on the tail end of the pen-stylus, which allows users to erase content from the display (e.g., the display screen) of the computing device, e.g., the e-paper tablet 110 shown in FIG. 1. Unlike a conventional eraser, a tail eraser may be configured to provide erasure information even when the tail erasing part of the active pen-stylus is not touching or otherwise in physical contact with the display, in part because of the presence of one or more antennas in the active pen-stylus associated with the erasure function.

Figure 15:
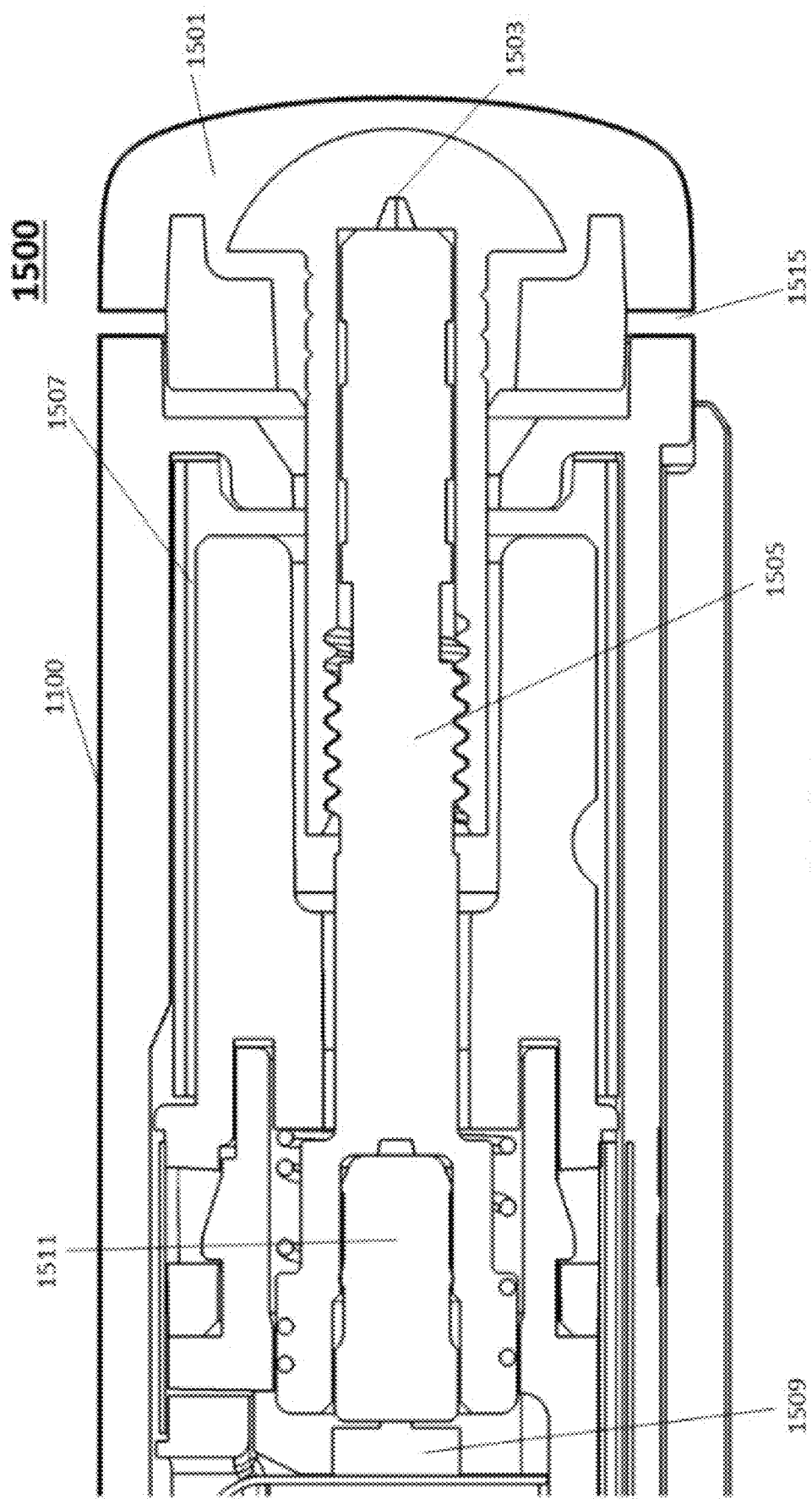
FIG. 15 illustrates a rear portion 1500 of the pen-stylus 1100 that includes an eraser cap 1501, a first rear antenna 1503, a second rear antenna 1507, a rear erasure shaft 1505, a rear eraser gap 1515, a rear shock absorber 1511, and a rear force sensor 1509, according to an embodiment of the invention.

FIG. 15 illustrates a rear portion 1500 of the pen-stylus 1100 that includes an eraser cap 1501, a first rear antenna 1503, a second rear antenna 1507, a rear erasure shaft 1505, a rear eraser gap 1515, a rear shock absorber 1511, and a rear force sensor 1509, according to an embodiment of the invention. The first rear antenna 1503 and the second rear antenna 1507 may operate as part of the core member 1103 shown in FIG. 11, and the rear force sensor 1509 operates as the force sensing system 1107. The rear shock absorber 1511 may protect the force sensing system 1107 from shocks such as those arising from the pen-stylus 1100 being dropped. Like a conventional eraser, the rear eraser gap 1515 may enable movement as the user makes erasures on the display of the tablet, e.g., e-paper tablet 110, according to an embodiment of the invention.

A conventional rubber eraser may be used in a number of different ways and orientations with different results. For example, when using a conventional rubber eraser, one can control the area of erasure by adjusting the angle of incidence of the rubber eraser to allow a larger or smaller area to be actively erased. Among other things, an active pen-stylus erasure function may be designed to replicate this feature found in rubber erasers and to perform such functions without the active pen-stylus eraser necessarily touching the display.

Accordingly, the active pen stylus 1100 includes additional structures and functional configurations to provide this advanced erasure capability. This same structure may also be used for other functions, such as controlling the opacity (and/or opacity of the erasure area) with the additional tilt information; however, the examples provided below will focus on the erasure function—although the primary difference is what the display is instructed to do with the information that it receives from the pen-stylus.

Figure 16:
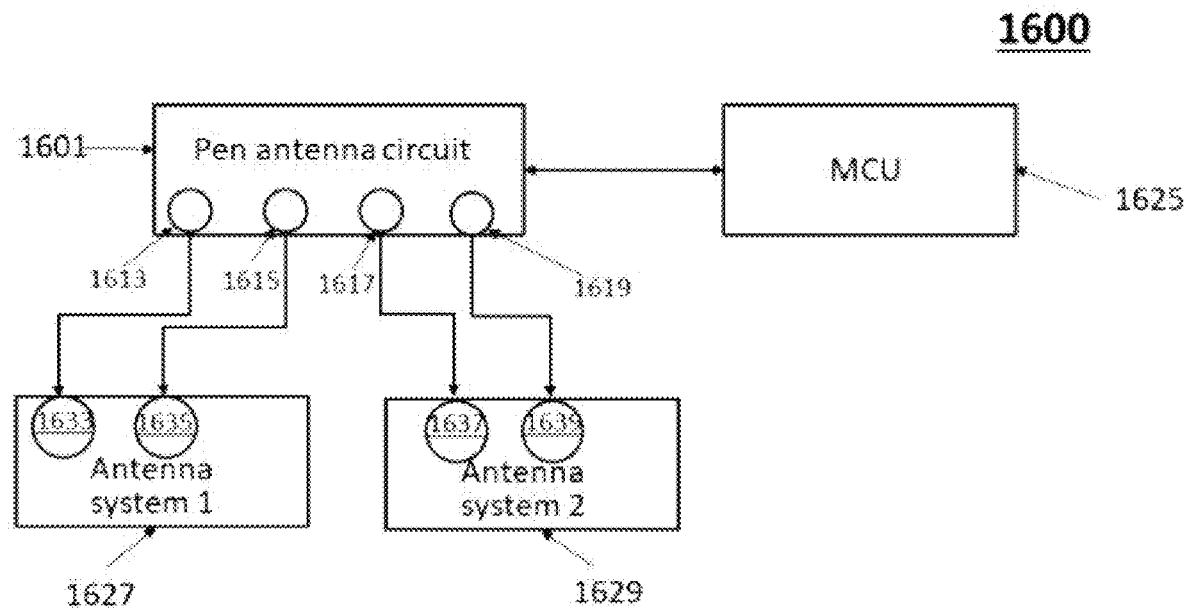
FIG. 16 illustrates a hardware structure 1600 that provides the appropriate data transmission to a computing device, such as an e-paper tablet device, for computing the tilt of the pen-stylus tip and/or tilt of the tail eraser on the pen-stylus.

FIG. 16 illustrates a hardware structure 1600 that provides and directs the appropriate data transmission to a computing device, such as an e-paper tablet device (e.g., the e-paper tablet device 110), for computing the tilt of the pen-stylus tip and/or tilt of the tail eraser on the pen-stylus. In short, the pen antenna circuit 1601 shown in FIG. 16 comprises four antenna signal lines rather than the three antenna signal lines conventionally employed. As discussed below, some embodiments of the invention employ conventional pen integrated circuits that have been specially adapted to handle the extra fourth antenna signal line that arises when two antennas are employed in the front of the pen-stylus and two more antennas are employed in the rear of the pen-stylus.

The hardware structure 1600 for implementation into the pen-stylus 1100 shown in FIG. 11 comprises a pen antenna circuit 1601, a micro-control unit 1625, and a first antenna system 1 1627, and a second antenna system 2 1629. Antenna system 1 1627 comprises two antennas 1633, 1635 that respectively connect to antenna signal lines 1613, 1615 in the pen antenna circuit 1601, and antenna system 2 1629 comprises two antennas 1637, 1639 that respectively connect to antenna signal lines 1617, 1619 in the pen antenna circuit 1601. The pen antenna circuit 1601 may itself be considered to comprise two pen antenna circuits that each handle two sets of signal lines, according to some embodiments of the invention.

As mentioned, the pen antenna circuit 1601 has an added fourth antenna signal line 1619, which provides one more antenna signal line than conventionally employed (e.g., signal lines 1613-1617). Thus, adding a fourth signal line (through the various hardware modifications discussed below), enables operation of two separate but similar antenna systems (Antenna System 1 1627 and Antenna System 2 1629) that are capable of transmitting sufficient information for derivation of the tilt angle (e.g., the tilt angle θ 1407 shown in FIGS. 14A and 14B and/or the tilt angle θ 1307 shown in FIGS. 13A and 13B), as well as conventional pen-stylus drawing and erasure functionality. Accordingly, FIG. 16 illustrates a hardware structure 1600 that can provide the appropriate data transmission to a computing device (e.g., the e-paper tablet device 110) for computing the tilt angle (e.g., the tilt angle θ 1407 shown in FIGS. 14A and 14B) of the tail eraser as well as the tilt angle of the pen-stylus tip. As such, the Antenna System 2 1629 comprises an eraser antenna system.

The pen antenna circuit 1601 is connected to the antenna systems 1627, 1629 that each comprises two transmitters (transmitters 1633, 1635 for antenna system 1627 and transmitters 1637, 1639 for antenna system 1629. Thus, the two antenna systems 1627, 1629 together have a total of four transmitters. This combination allows one pair of antennas to transmit data related to the front core member 1102 shown in FIG. 11, thus forming an active pen-stylus antenna system, while another pair of antennas transmits data from the tail core member 1103 shown in FIG. 11, thus forming an eraser antenna system. As mentioned above, in some embodiments of the invention, the pen antenna circuit 1601 may itself comprise a first pen antenna circuit that handles one set of two antennas and a second pen antenna circuit that handles a second set of two antennas.

As mentioned in conjunction with FIGS. 13A-13B and FIGS. 14A-14B, derivation of the tilt angle of the tail eraser may be determined by employing an electronically calculated method in the input digitizer 220 similar to that employed by the input digitizer 220 for determining the tilt of the marker tip. However, conventional pen-stylus integrated circuits (e.g., included in the PCBA 1105) may not have a sufficient number of antenna signal lines for driving two transmitters in both the active pen tip and two transmitters in the tail eraser antenna system. Conventional active pens have two antenna signal lines for the active pen-stylus tip and one antenna signal line for a tail eraser. Thus, no more than three antenna signal lines are conventionally available. With this conventional configuration, the input digitizer 220 (or comparable hardware) cannot derive the tilt information for the tail eraser. The inventors have solved this problem in a manner that allows a conventional active pen configuration to drive four antennas rather than the conventional three antennas, thus enabling enhanced erasure capabilities.

As mentioned above, a conventional pen antenna circuit supports no more than three antenna signal lines. Thus, the inventors have also created a way for enabling a conventional pen antenna circuit to support four antenna signal lines rather than just three. A conventional pen antenna circuit is typically implemented with a single pen integrated circuit, and such conventional hardware may be employed in embodiments of the present invention. Thus, the pen antenna circuit 1601 shown as providing four output signal lines may be considered the result of the various hardware combinations discussed below. For example, the pen antenna circuit 1601 may be implemented as several pen circuits (e.g., a first pen antenna circuit and a second pen antenna circuit) that act together to effectively form the pen antenna circuit 1601. As noted, the two antenna systems 1627 and 1629 correspond to the core (antenna systems) 1102 and 1103 shown in FIG. 11.

As is known in the art, it is possible in a conventional hardware installation to use the third antenna signal line for a tail eraser embodiment having only one transmitter—but such a configuration cannot provide the tilt information needed for the embodiments of the invention described herein. To overcome this limitation, the inventors have created a way to employ a fourth antenna signal line in a conventional pen integrated circuit to communicate through a fourth antenna.

Figure 16A:
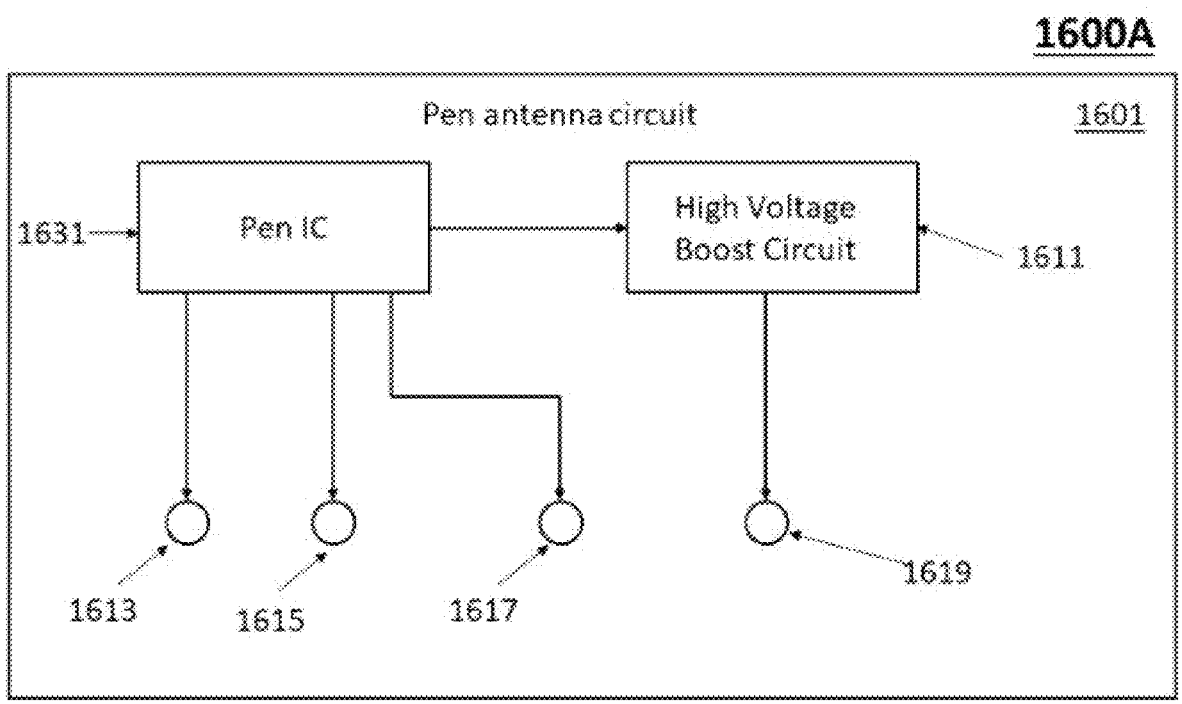
FIG. 16A illustrates an embodiment of the invention in which the pen antenna circuit 1601 employs a conventional Pen IC 1631 having a general purpose input/output port (GPIO) of the Pen IC 1621 and a high voltage boost circuit 1611 in order to enable a fourth antenna signal line.
Figure 16B:
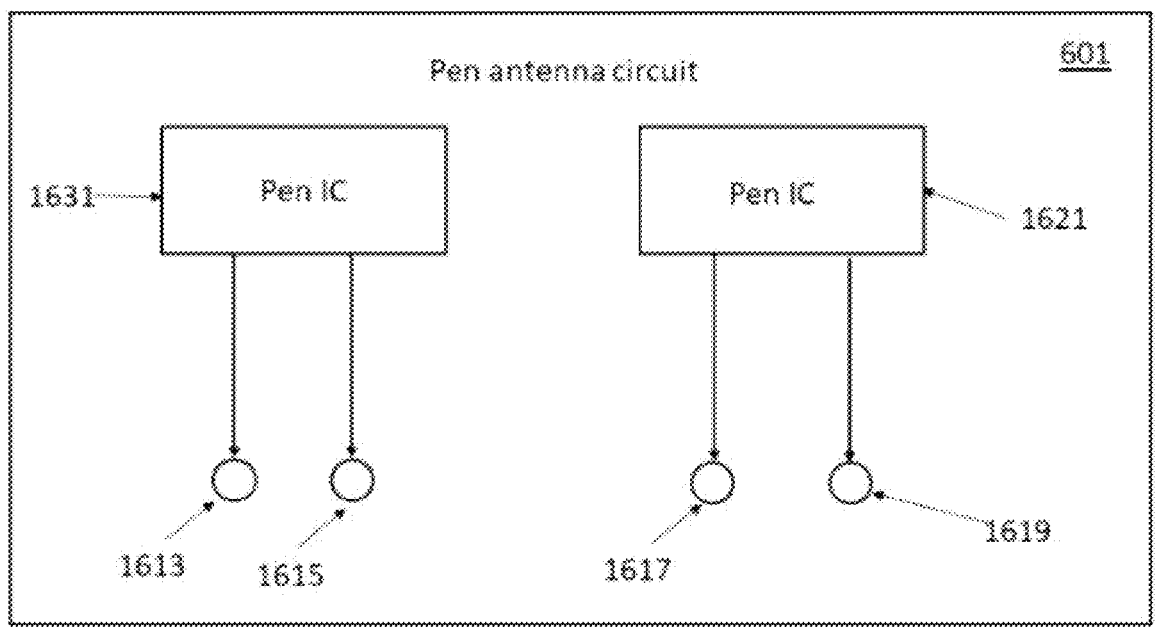
FIG. 16B illustrates an embodiment of the invention in which the pen antenna circuit 601 employs two pen ICs 1631, 1621 that are controlled by the MCU 1625 shown in FIG. 16 in order to enable a fourth antenna signal line.
Figure 16C:
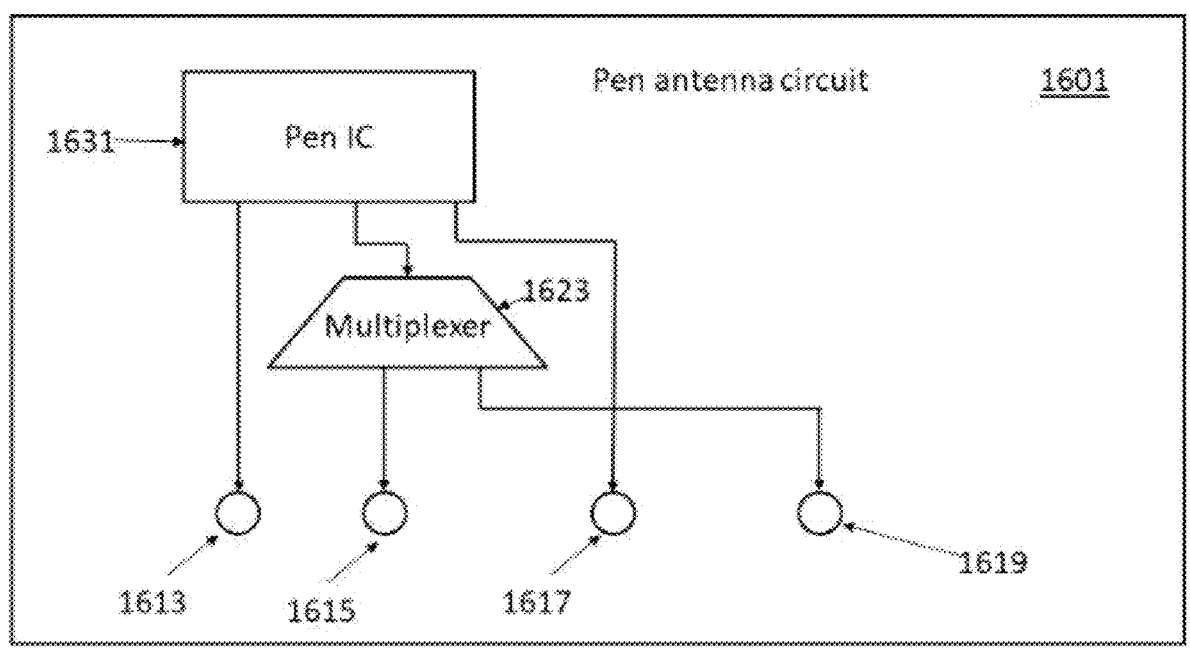
FIG. 16C illustrates an embodiment of the invention in which the pen antenna circuit 1601 employs a conventional Pen IC 1631 where the signals (e.g., 1401a, 1403a and/or 1401b, 1403b shown in FIGS. 14A and 14B) are multiplexed in a signal multiplexer 1623 and controlled by a microcontrol unit 1625 (shown in FIG. 16) in order to enable a fourth antenna signal line.
Figure 16D:
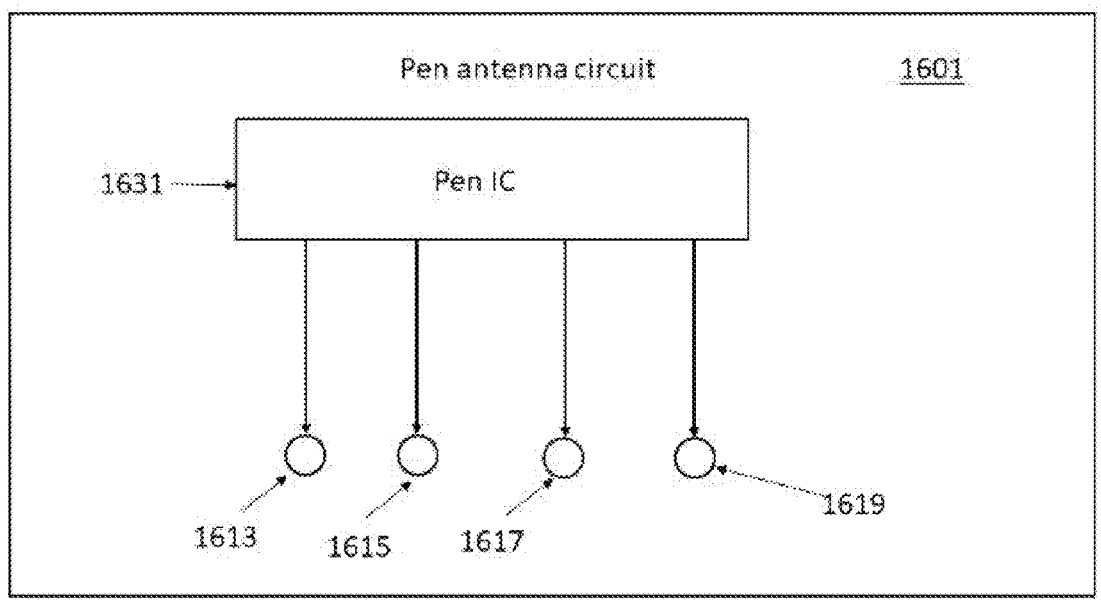
FIG. 16D illustrates an embodiment of the invention in which the pen antenna circuit 601 employs a Pen IC 1631 that supports the four antenna outputs 1613, 1615, 1617, and 1619 natively.

The inventors have created several embodiments of the invention that overcome the limitations of conventional hardware, as shown in FIGS. 16A-16C. In addition, the inventors have also created an embodiment of the invention, as shown in FIG. 16D, in which the pen antenna circuit has four antenna signal lines natively, which represents a type of hardware not conventionally employed in pen-styluses.

FIG. 16A illustrates an embodiment of the invention in which the pen antenna circuit 1601 comprises a conventional Pen IC 1631 having three antenna signal lines and having at least one general purpose input/output port (GPIO) in the Pen IC 1631 and a high voltage boost circuit 1611 in order to enable a synthetic fourth antenna signal line. Thus, the fourth antenna signal 1619 is essentially created from a weak signal transmitted out of a conventional GPIO and then boosted appropriately by the high voltage boost circuit 1611 to achieve an appropriate antenna signal strength. In this particular embodiment, Antenna system 1 1627 that receives signals from the signal lines 1613, 1615 would be the active pen-stylus tip and Antenna system 2 1629 receives signals from the signal lines 1617, 1619 correspond to the precise eraser (e.g., the signals 1401*a*, 1403*a* and/or 1401*b*, 1403*b* shown in FIGS. 14A and 14B). Thus, in this embodiment, Antenna system 1 1627 corresponds to the core (antenna) 1102 shown in FIG. 11 (e.g., an active pen-stylus antenna system) while antenna system 2 1629 corresponds to the core (antenna) 1103 shown in FIG. 11, thus comprising an eraser antenna system.

FIG. 16B illustrates an embodiment of the invention in which the pen antenna circuit 1601 comprises two pen ICs 1631, 1621 that are controlled by a micro-control unit, e.g., the MCU 1625 shown in FIG. 16. In this particular embodiment, the Antenna system 1 1627 that receives signals from the signal lines 1613, 1615 would be the active pen-stylus tip and Antenna system 2 1629 that receives signals from the signal lines 1617, 1619 would be the tilt eraser (e.g., the signals 1401*a*, 1403*a* and/or 1401*b*, 1403*b* shown in FIGS. 14A and 14B). Thus, in this embodiment, Antenna system 1 1627 corresponds to core (antenna) 1102 shown in FIG. 11 (e.g., an active pen-stylus antenna system) and antenna system 2 1629 corresponds to core (antenna) 1103 shown in FIG. 11, thus comprising an eraser antenna system.

FIG. 16C illustrates an embodiment of the invention in which the pen antenna circuit 1601 comprises a conventional Pen IC 1631 where the signals (e.g., 1401*a*, 1403*a* and/or 1401*b*, 1403*b* shown in FIGS. 14A and 14B) are multiplexed in a signal multiplexer 1623 and controlled by the micro-control unit 1625 (shown in FIG. 16). The micro-control unit 1625 and the Pen IC 1631 communicate in order to set the multiplexing of one antenna signal. In this particular embodiment, Antenna system 1 1627 would be the active pen-stylus tip and Antenna system 2 1629 would be the tilt eraser. Thus, in this embodiment, Antenna system 1 1627 corresponds to core (antenna) 1102 shown in FIG. 11 (e.g., an active pen-stylus antenna system) and antenna system 2 1629 corresponds to the core (antenna) 1103 shown in FIG. 11, thus comprising an eraser antenna system.

FIG. 16D illustrates an embodiment of the invention in which the pen antenna circuit 1601 employs a Pen IC 1631 that supports the four antenna outputs 1613, 1615, 1617, and 1619 natively. As mentioned, a pen integrated circuit that supports four antenna outputs is not conventionally employed in pen-styluses. In this particular embodiment, Antenna system 1 1627 would be the active pen-stylus tip and Antenna system 2 1629 would be the tilt eraser (e.g., the signals 1401*a*, 1403*a* and/or 1401*b*, 1403*b* shown in FIGS. 14A and 14B). Thus, in this embodiment, Antenna system 1 1627 corresponds to the core (antenna) 1102 shown in FIG. 11 (e.g., an active pen-stylus antenna system) and antenna system 2 1629 corresponds to core (antenna) 1103 shown in FIG. 11, thus comprising an eraser antenna system.

Figure 17:
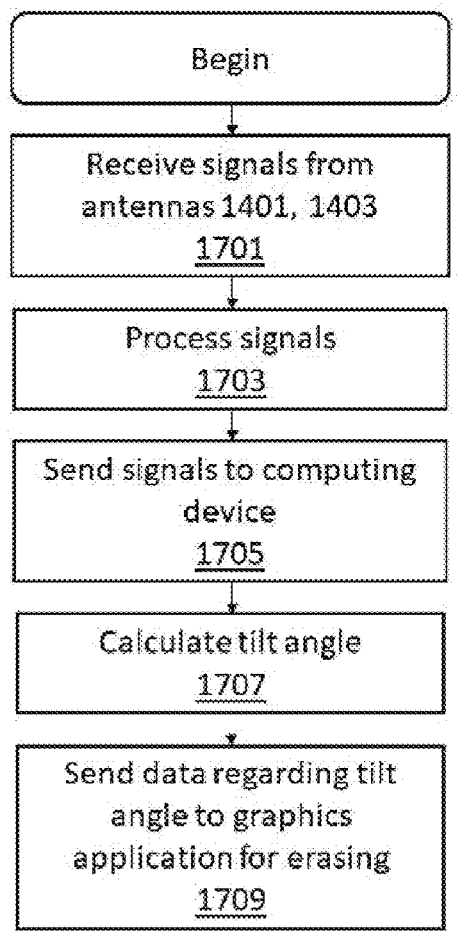
FIG. 17 illustrates a flowchart 7100 showing the steps performed in determining the tilt angle of the pen-stylus and how the calculated tilt angle may be used to determine an amount of erasure on the display of the e-paper tablet device, according to one embodiment.

FIG. 17 illustrates a flowchart 1700 that shows the steps performed in determining the tilt angle θ 1407 shown in FIG. 14B of the pen-stylus relative to the graphics display and how this tilt angle may be used to determine an amount of erasure on the display 230. The signals from the antenna 1401, 1403 are received (step 1701) in a circuit (e.g., the hardware structure 1600 shown in FIG. 16) in the pen-stylus 1408. The received signals are processed (step 1703) by the pen antenna circuit 1601 shown in FIG. 16. The antenna system (e.g., the antenna system 2 1629 shown in FIG. 16, which may also be the core (antenna) 1103 shown in FIG. 11), sends (step 1705) the processed signals to the computing device (e.g., the e-paper tablet 110). The input digitizer 220 in the computing device calculates (step 1707) the tilt angle of the pen-stylus 1408 in the manner described previously and sends (step 1709) to the display system 230 in the computing device 110 to perform the erasing (step 1711). Some steps shown in the flowchart 1700 could be performed in another order. For example, step 1707 could be performed either before or after step 1705.

Figure 18B:
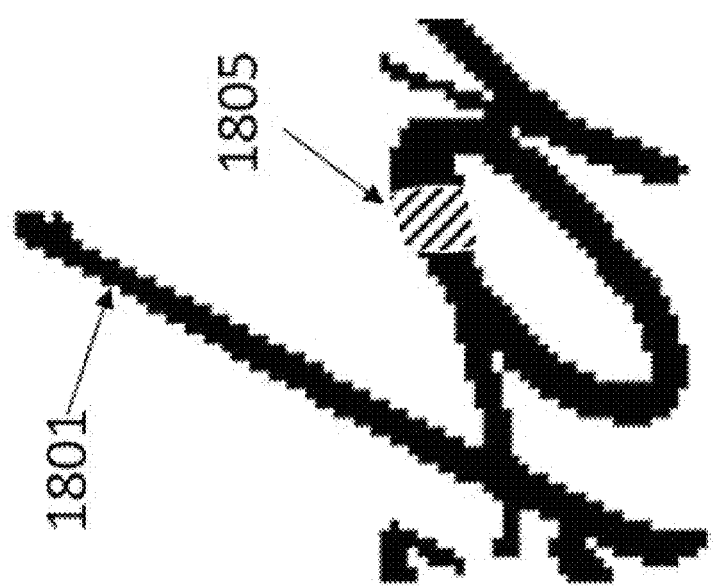
FIGS. 18A-18B illustrate the results of the different types of erasures made on a graphics display depending on the calculated tilt angle, according to one embodiment.
Figure 18A:
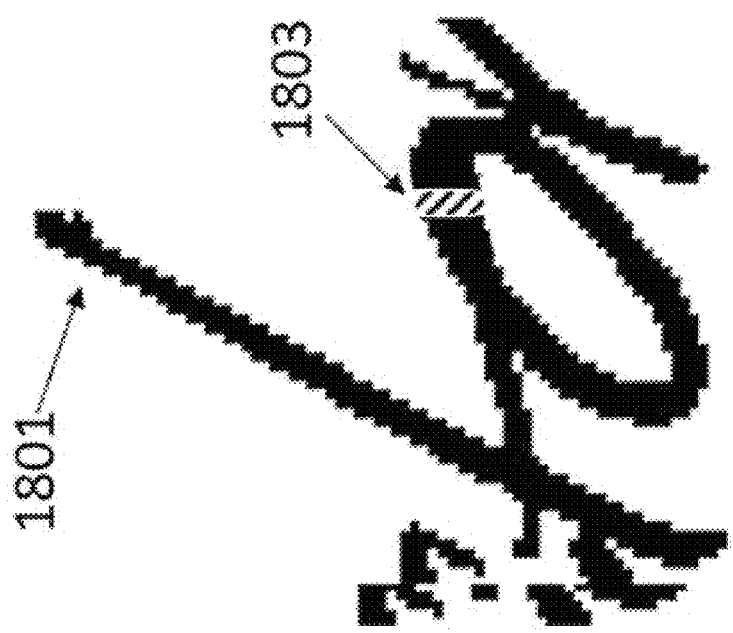

FIG. 18A and FIG. 18B illustrate the results of the different types of erasures made to a graphics display depending on the calculated tilt angle, according to an embodiment of the invention. FIG. 18A shows a drawing 1801 in the case where the tilt angle between the two antennas on the pen-stylus is identical, meaning that the pen-stylus is perpendicular (or 90°) to the graphics display of the e-paper tablet device. At a perpendicular (90°) tilt angle, the area of erasure is rather slender as shown by erasure zone 1803. FIG. 18B illustrates the case in which the tilt angle between the two antennas on the pen-stylus is not aligned, and the pen-stylus is not perpendicular to the graphic display but is tilted at an angle. In such embodiments of the invention, a larger area of erasure 1805 will occur on the drawing 1801. The process of updating an EPD display has been previously shown in FIG. 4. The amount of erasure 1805 would increase or decrease depending on the actual tilt angle. In essence a larger tilt angle approach 0° or 180° will produce a greater area of erasure, and the size of the area of erasure increases as the tilt angle approaches 0° or 180°, according to an embodiment of the invention.

Additional Considerations

As discussed below, these pen-styluses can be equipped with a tail eraser allowing the user to erase content from the display of the computing device, e.g., the e-paper tablet 110. An active pen includes electronics components which enables the active pen to send and receive signals from the computing device.

This disclosed configuration provides additional precision and options for users as they go about erasing portions of drawings on an e-paper tablet. This should improve the efficiency of users interacting with e-paper tablets while also enabling them with more precise functional capabilities.

It is to be understood that the figures and descriptions of the present disclosure have been simplified to illustrate elements that are relevant for a clear understanding of the present disclosure, while eliminating, for the purpose of clarity, many other elements found in a typical system. Those of ordinary skill in the art may recognize that other elements and/or steps are desirable and/or required in implementing the present disclosure. However, because such elements and steps are well known in the art, and because they do not facilitate a better understanding of the present disclosure, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise. While particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A method for determining an area of erasure on a screen of a display device, comprising:
    receiving in an active pen-stylus user drawing data input related to drawing on the screen of the display device and converting the drawing data to an electronic drawing data signal;
    receiving the electronic drawing data signal in a first pen antenna circuit in the active pen-stylus that processes the electronic drawing data signal and sending the processed electronic drawing data signal to an active pen stylus antenna system;
    transmitting the processed electronic drawing data signal from the active pen-stylus antenna system to the display device for display on the screen, the active pen-stylus antenna system comprising at least two antennas proximally located in a front portion of the active pen-stylus;
    receiving user erasure data related to erasing at least a portion of the drawing on the screen of the display device in the active pen-stylus and converting the user erasure data to an electronic erasure data signal;
    receiving the electronic erasure data signal in a second pen antenna circuit in the active pen-stylus that processes the electronic erasure data signal and sending the processed electronic erasure data signal to an erasure antenna system, the eraser antenna system comprising at least two antennas, the eraser antenna system proximally located in a rear portion of the active pen-stylus, wherein a first antenna of the at least two antennas in the eraser antenna system has a different location in the rear of the active pen-stylus than a second of the at least two antennas in the eraser antenna system, wherein the processed electronic erasure data signal includes orientation data related to the first antenna and the second antenna of the at least two antennas in the eraser antenna system;
    transmitting the processed electronic erasure data signal from the erasure antenna system on the active pen-stylus to the display device for erasing at least the portion of the drawing on the screen of the display device,
    wherein a graphics display component in the display devices uses the received processed electronic erasure data signal to compute a tilt angle between the first of the at least two antennas in the eraser antenna system and the second of the at least two antennas in the eraser antenna system to determine the area of erasure associated with the portion of the drawing on the screen of the computing device.

2. The method for determining an area of erasure of claim 1, wherein the first pen antenna circuit and second pen antenna circuit comprise a single integrated circuit having no more than three antenna output signal lines and a general purpose input/output port (GPIO), and wherein the eraser antenna system includes a high voltage boost circuit, the method further comprising:
receiving a fourth antenna output signal in the high voltage boost circuit;
boosting the received fourth antenna output signal to antenna signal strength;
transmitting the boosted received fourth antenna output signal from the high voltage boost circuit to the GPIO in the single integrated circuit; and
transmitting the boosted fourth antenna output signal from the single integrated circuit to the display device.

3. The method for determining an area of erasure of claim 1, wherein the first pen antenna circuit comprises two output signal lines and the second pen antenna circuit comprises two output signal lines, the method further comprising:
switching antenna activation between the first pen antenna circuit and the second pen antenna circuit using a micro-control unit.

4. The method for determining an area of erasure of claim 1 wherein the first pen antenna circuit and second pen antenna circuit comprise a single integrated circuit having no more than three antenna output signal lines, the method further comprising:
receiving in a multiplexer a third output signal line of the three output signal lines from the single integrated circuit; and
directing by a micro-control unit the multiplexer to send the third output signal line to one of an antenna of the active pen-stylus antenna system and an antenna of the eraser antenna system, wherein the micro-control unit alternates between the antenna of the active pen-stylus antenna system and the antenna of the eraser antenna system.

5. The method for determining an area of erasure of claim 1, wherein the first pen antenna circuit and second pen antenna circuit comprise a single integrated circuit having four output signal lines, the method further comprising:
sending two output signals to the active pen-stylus antenna system; and
sending two output signals to the erasure antenna system.

6. The method for determining an area of erasure of claim 1, the method further comprising:
receiving the user erasure data without the active pen-stylus being in physical contact with the screen of the display device.

7. The method for determining an area of erasure of claim 1, the method further comprising:
increasing the area of erasure in direct correlation to a degree of the computed tilt angle by a graphics display component in the display device.

8. The method for determining an area of erasure of claim 7, the method further comprising:
increasing the area of erasure in direct proportion to the degree of the computed tilt angle by the graphics display component.

9. The method for determining an area of erasure of claim 7, the method further comprising:
increasing the area of erasure in inverse proportion to the degree of the computed tilt angle by the graphics display component.

10. The method for determining an area of erasure of claim 1, wherein the received user drawing data input includes force sensing data.

11. The method for determining an area of erasure of claim 1, wherein the received user erasure data includes force sensing data.

12. The method for determining an area of erasure of claim 1, wherein the active pen-stylus antenna system comprising at least two antennas, the active pen-stylus system proximally located in a forward portion of the active pen-stylus, wherein a first antenna of the at least two antennas in the active pen-stylus antenna system has a different location in the forward portion of the active pen-stylus than a second of the at least two antennas in the active pen-stylus antenna system, wherein the processed electronic data drawing signal includes orientation data related to the first antenna and the second antenna of the at least two antennas in the active pen-stylus antenna system,
wherein a graphics display component in the display device computes a tilt angle between the first of the at least two antennas in the drawing antenna system and the second of the at least two antennas in the active pen-stylus antenna system to determine an area of marking on the screen of the display device.

* * * * *